US011555086B2

United States Patent
Seo et al.

(10) Patent No.: US 11,555,086 B2
(45) Date of Patent: Jan. 17, 2023

(54) METHOD OF SYNTHESIZING HYDROCARBON POLYMERS USING DEOXYGENATION

(71) Applicant: KOREA ADVANCED INSTITUTE OF SCIENCE AND TECHNOLOGY, Daejeon (KR)

(72) Inventors: Myungeun Seo, Daejeon (KR); Chung Sub Jeon, Daejeon (KR); Sukbok Chang, Daejeon (KR); Dong Wook Kim, Daejeon (KR); Taeseok Oh, Daejeon (KR); Seong Jang Jeon, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 81 days.

(21) Appl. No.: 16/940,502

(22) Filed: Jul. 28, 2020

(65) Prior Publication Data

US 2021/0032395 A1 Feb. 4, 2021

(30) Foreign Application Priority Data

Jul. 30, 2019 (KR) .................. 10-2019-0092290
Jul. 28, 2020 (KR) .................. 10-2020-0093619

(51) Int. Cl.
*C08F 293/00* (2006.01)
*C08F 10/06* (2006.01)
(Continued)

(52) U.S. Cl.
CPC .......... *C08F 293/005* (2013.01); *C08F 10/00* (2013.01); *C08F 10/02* (2013.01);
(Continued)

(58) Field of Classification Search
USPC ..................................... 526/348.7
See application file for complete search history.

(56) References Cited

U.S. PATENT DOCUMENTS 3,481,908 A * 12/1969 Mortimer ................ C08F 10/00
526/227
5,763,556 A * 6/1998 Shaffer ................ C08F 210/02
526/348.4
(Continued)

FOREIGN PATENT DOCUMENTS

KR 1020150135361 A 12/2015

OTHER PUBLICATIONS

Kasalo, et al, "Quantitative NMR Spectroscopy and Determination of Polymer Microstructure of Ethylene-Styrene and Ethylene-Isobutylene Co-Polymers," Macromol. Symp. 2013, 324, 78-81. (Year: 2013).*

(Continued)

*Primary Examiner* — Fred M Teskin
(74) *Attorney, Agent, or Firm* — Hultquist, PLLC; Steven J. Hultquist

(57) ABSTRACT

The present invention relates to a method of synthesizing hydrocarbon polymers using a deoxygenation reaction, wherein, by deoxygenating polymers including oxygen atom-containing functional groups in side chains thereof to thereby remove the functional groups of the side chains, various block copolymers including polyolefins and hydrocarbon polymers with complex architectures can be synthesized.

12 Claims, 38 Drawing Sheets
(32 of 38 Drawing Sheet(s) Filed in Color)

(51) Int. Cl.
 C08F 10/00 (2006.01)
 C08F 10/02 (2006.01)
 C08F 16/38 (2006.01)
 C08F 10/10 (2006.01)
 C08F 12/08 (2006.01)
(52) U.S. Cl.
 CPC ............ *C08F 10/06* (2013.01); *C08F 10/10* (2013.01); *C08F 12/08* (2013.01); *C08F 16/38* (2013.01); *C08F 2438/03* (2013.01)

(56) References Cited

U.S. PATENT DOCUMENTS 6,586,646 B1 * 7/2003 Heilman ............... C08F 210/16 585/12
6,828,397 B2 * 12/2004 Boussie ................. C07F 7/003 526/161

OTHER PUBLICATIONS

Safety Data Sheet: Isobutylene, Airgas, 11 pages, Date of issue/Date of revision: May 10, 2018 (Year: 2018).*
Adduci, L., et al., "Metal-Free Deoxygenation of Carbohydrates", "Angew. Chem.", 2014, pp. 1672-1675, vol. 126.
Anderson-Wile, A., et al., "Living Alkene Polymerization for Polyolefin Architectures", "Complex Macromolecular Architectures: Synthesis, Characterization, and Self-Assembly", 2011, pp. 267-316, Publisher: John Wiley and Sons.
Arriola, D., et al., "Catalytic Production of Olefin Block Copolymers via Chain Shuttling Polymerization", "Science", 2006, pp. 714-719, vol. 312.
Bae, C., et al., "Catalytic Hydroxylation of Polypropylenes", "J. Am. Chem. Soc.", 2005, pp. 767-776, vol. 127.
Bezier, D., et al., "Selective Reduction of Carboxylic Acids to Aldehydes Catalyzed by B(C6F5)3", "Organic Letters", 2013, pp. 496-499, vol. 15, No. 3.
Boaen, N., et al., "Post-Polymerization Functionalization of Polyolefins", "Chem. Soc. Rev.", 2005, pp. 267-275, vol. 34.
Braunecker, W., et al., "Controlled/Living Radical Polymerization: Features, Developments, and Perspectives", "Prog. Polym. Sci.", 2007, pp. 93-146, vol. 32.
Bunescu, A., et al., "Catalytic Hydroxylation of Polyethylenes", "ACS Central. Science", 2017, pp. 895-903, vol. 3.
Chen, E., et al., "Cocatalysts for Metal-Catalyzed Olefin Polymerization: Activators, Activation Processes, and Structure-Activity Relationships", "Chem. Rev.", 2000, pp. 1391-1434, vol. 100.
Chung, T.C., "Synthesis of Chain-end Functionalized Polyolefins and Polyolefin Diblock Copolymers via the Combination of Metallocene Catalysts and Reactive Chain Transfer Agents", "Israel Journal of Chemistry", 2002, pp. 307-332, vol. 42.
Crawford, K., et al., "De Novo Design of a New Class of Hard-Soft Amorphous, Microphase-Separated, Polyolefin Block Copolymer Thermoplastic Elastomers", "ACS Macro Letters", 2015, pp. 921-925, vol. 4.
Eagan, J., et al., "Combining Polyethylene and Polypropylene: Enhanced Performance with PE/iPP Multiblock Polymers", "Science", Feb. 24, 2017, pp. 814-816, vol. 355.
Easterling, C., et al., "Synthetic Upcycling of Polyacrylates Through Organocatalyzed Post-Polymerization Modification", "Chemical Science", 2017, pp. 7705-7707, vol. 8.
Feghali, E., et al., "Catalytic Hydrsilylaton of Oxalic Acid: Chemoseiective Formation of Functionalized C2-Products", "Catalysis Science and Technology", 2014, pp. 2230-2234, vol. 4.
Feghali, E., et al., "Room Temperature Organocatalyzed Reductive Depolymerization of Waste Polyethers,, Polyesters, and Polycarbonates", "ChemSusChem", 2015, pp. 980-984, vol. 8, No. 6.
Franssen, N., et al., "Synthesis of Functional Polyolefins: State of the Art and Remaining Challenges", "Chem Soc Rev", 2013, pp. 5809-5832, vol. 42.
Galland, G.B., et al., "13 C NMR Determination of the Microstructure of Polypropylene Obtained With the DADNi (NCS)2/Methylaluminoxane Catalyst System", "J. Polym. Sci. Part A: Polym. Chem.", 2004, pp. 2171-2178, vol. 42.
Gauthier, M., et al., "Synthesis of Functional Polymers by Post-Polymerization Modification", "Angew. Chem. Int. Ed.", 2009, pp. 48-58, vol. 48.
Gevorgyan, V., et al., "A Novel Reduction of Alcohols and Ethers With a HSiEt3/Catalytic B(C6F5)3 System", "Tetrahedron Letters", 1999, pp. 8919-8922, vol. 40.
Gevorgyan, V., et al., "A Novel B(C6F5)3-Catalyzed Reduction of Alcohols and Cleavage of Aryl and Alkyl Ethers with Hydrosilanes", "J. Org. Chem.", 2000, pp. 6179-6186, vol. 65.
Hirao, A., et al., "Advances in Living Anionic Polymerization: From Functional Monomers, Polymerization Systems, to Macromolecular Architectures", "Macromolecules", 2014, pp. 1883-1905, vol. 47.
Kaise, H., et al., "TMSCN/DBU-Mediated Facile Redox Transformation of alpha,Beta-Unsaturated Aldehydes to Carboxylic Acid Derivatives", "Organic Letters", 2014, pp. 727-729, vol. 16.
Kaminsky, W., "Trends in Polyolefin Chemistry", "Macrmolecular Chemistry and Physics", 2008, pp. 459-466, vol. 209.
Kim, D., et al., "Metal-Free Hydrosilylation Polymerization by Borane Catalyst", "Angew. Chem. Int. Ed.", 2015, pp. 14805-14809, vol. 54.
Kim, S., et al., "Peroxide-Mediated Alkyl-Alkyl Coupling of Dialkylzinc: A Useful Tool for Synthesis of ABA-Type Olefin Triblock Copolymers", "Macromolecules", 2018, pp. 4821-4828, vol. 51.
Lai, J., et al., "Functional Polymers from Novel Carboxyl-Terminated Trithiocarbonates as Highly Efficient RAFT Agents", "Macromolecules", 2002, pp. 6754-6756, vol. 35.
Larsen, M., et al., "Poly(allyl alcohol) Homo- and Block Polymers by Postpolymerization Reduction of an Activated Polyacrylamide", "J. Am.Chem. Soc.", 2018, pp. 11911-11915, vol. 140.
Liu, D., et al., "Direct Azidation of Isotactic Polypropylene and Synthesis of Grafted to Derivatives Thereof Using Azide-Alkyne Cycloaddition Chemistry", "Poiym. Int.", 2017, pp. 70-76, vol. 66, No. 1.
Moad, G., et al., "Living Radical Polymerization by the RAFT Process—A Third Update", "Aust. J. Chem.", 2012, pp. 985-1076, vol. 65.
Nakamura, Y., et al., "Controlled Radical Polymerization of Ethylene Using Organotellurium Compounds", "Angew. Chem. Int. Ed.", 2018, pp. 305-309, vol. 57.
Oestreich, M., et a l., "A Unified Survey of Si—H and H—H Bond Activation Catalysed by Electron-Deficient Boranes", "Chem. Soc. Rev.", 2015, pp. 2202-2220, vol. 44.
Parks, D., et al., "Tris(pentafluorophenyl)boron-Catalyzed Hydrosilation of Aromatic Aldehydes, Ketones, and Esters", "J. Am. Chem. Soc.", 1996, pp. 9440-9441, vol. 118.
Saito, K., et al., "B(C6F5)3-Catalyzed Hydrodesulfurization Using Hydrosilanes—Metal-Free Reduction of Sulfides", "Organic Letters", 2015, pp. 3366-3369, vol. 17.
Shirini, F., et al., "Mg(HSO4)2 As A Mild and Efficient Reagent for Acetylation of Alcohols", "Int. J. Chem. Soc.", 2003, pp. 53-56, vol. 1, No. 1.
Wu, Z., et al., "Synthesis of Narrow Dispersed Linear Polyethylene and Block Copolymers from Polycyclobutene", "Macromolecules", 1994, pp. 6700-6703, vol. 27.
Yoon, J., et al., "Optically Transparent and High Molecular Weight Polyolefin Block Copolymers Toward Self-Assembled Photonic Band Gap Materials", "Macromolecules", 2006, pp. 1913-1919, vol. 39.
Yu, H., et al., "Microphase Structures of Poly(styrene-beta-ethylene/propylene) Diblock Copolymers Investigated by Solid-State NMR and Small Angle X-Ray Scattering Techniques", "Macromolecules", 1999, pp. 4365-4374, vol. 32.
Nakayama, Y., et al., "Copolymerization of Ethylene with 1, 1-Disubstituted Olefins Catalyzed by ansa-(Fluorenyl) (cyclododecylamido) dimethyltitanium Complexes", Journal of Polymer Science, Part A Polymer Chemistry, 2013, pp. 1223-1229, vol. 51, Publisher: www.polymerchemistry.org.

* cited by examiner

METHOD OF SYNTHESIZING HYDROCARBON POLYMERS USING DEOXYGENATION

CROSS-REFERENCE TO RELATED APPLICATIONS

The priority of Korean Patent Application No. 10-2019-0092290 filed Jul. 30, 2019 and the priority of Korean Patent Application No. 10-2020-0093619 filed Jul. 28, 2020 are hereby claimed under the provisions of 35 USC § 119. The disclosures of Korean Patent Application No. 10-2019-0092290 and Korean Patent Application No. 10-2020-0093619 are hereby incorporated herein by reference in their respective entireties, for all purposes.

TECHNICAL FIELD

The present invention relates to a method of synthesizing hydrocarbon polymers using deoxygenation, and more particularly to a method of preparing a hydrocarbon polymer by deoxygenating a hydrocarbon polymer precursor having side chains with oxygen atom-containing functional groups bound thereto in the presence of a catalyst and a reducing agent to thereby remove the functional groups of the side chains.

BACKGROUND ART

Polyolefins such as polyethylene (PE) and polypropylene (PP) are the most widely used general-purpose plastics in modern life. Polyolefins are typical hydrocarbon polymers consisting of a polymer main chain with carbon-carbon linkages and without functional groups, and representative examples thereof are polyethylene with —[$CH_2$—$CH_2$]— repeating units, polypropylene with —[CH—$CHCH_3$]— repeating units, and polyisobutylene with —[CH—$C(CH_3)_2$] repeating units. These polymers are the most commonly produced materials in modern society, and play an essential role in sustaining and enriching our lives. As can be seen from the name of polyolefins, they are usually obtained by polymerizing monomers containing olefinic double bonds.

Most polyolefins are generally synthesized by metal-catalyzed coordination polymerization, and are commercially produced by metal-catalyzed coordination polymerization, which is first developed by Ziegler and Natta. To date, the design of polymerization catalysts capable of controlling the molar mass of molecules, branching, and the tacticity of polyolefins has progressed significantly (Chen, E. Y.-X. et al., Chem. Rev. 2000, 100, 1391-1434; Kaminsky, W., Macromol. Chem. Phys. 2008, 209, 459-466). Ziegler-Natta metal catalysts or metallocene metal catalysts are mainly used for the synthesis of polyethylene and polypropylene, and low-density polyethylene (LDPE) is also produced through radical polymerization. It is impossible to produce polypropylene through radical polymerization. Polyisobutylene is synthesized only through cationic polymerization.

However, most catalysts do not exhibit controlled polymerization behavior due to undesired irreversible chain transfer and/or (3-elimination routes. In recent years, numerous alkene polymerization catalysts exhibiting controlled properties have been developed and used for the synthesis of polyolefins with complex macromolecular structures such as block copolymers (Anderson-Wile, A. M. et al., Wiley: Singapore, 2011, Chap. 9). Nevertheless, the scope has been largely restricted to several structures (Chung, T. C., Israel J. Chem. 2001, 42, 307-332; Yoon, J. et al., Macromolecules 2006, 39, 1913-1919; Arriola, D. J. et al., Science 2006, 312, 714-719; Crawford, K. E. et al., ACS Macro Lett. 2015, 4, 921-925; Eagan, J. M. et al., Science 2017, 355, 814-816; Kim, S. D. et al., Macromolecules 2018, 51, 4821-4828), particularly when compared to the structural control level and vast compositional freedom provided by other controlled polymerization systems, including anionic (Hirao, A. et al., Macromolecules 2014, 47, 1883-1905) and controlled radical polymerization (Braunecker, W. A. et al., Frog. Polym. Sci. 2007, 32, 93-146). However, controlled radical polymerization of ethylene and propylene is inherently difficult, mainly due to the lack of pendant groups capable of stabilizing radicals (Nakamura, Y. et al., Angew. Chem. Int. Ed. 2018, 57, 305-309).

As such, polymerization methods using metal catalysts have the following limitations. 1) Since a metal catalyst is not compatible with functional groups containing heteroatoms such as oxygen, it is very difficult to synthesize functional polyolefins by copolymerizing monomers having functional groups. 2) In many cases, chain branching occurs, so it is difficult to obtain a polyolefin consisting of linear chains, and a large number of branches are irregularly present in the main chain. 3) For this reason, it is difficult to realize a complex architecture including block copolymers by extending chains with various monomers, like anionic polymerization or controlled radical polymerization. Therefore, in order to synthesize a well-controlled polyolefin, many attempts have been made to synthesize a well-controlled linear hydrocarbon-based polymer containing an olefin double bond in the main chain using anionic polymerization, ring-opening metathesis polymerization, and the like and to synthesize a well-controlled polyolefin by hydrogenating the same. Polystyrene-b-polyethylene-b-polystyrene and polystyrene-b-poly(ethylene-alt-propylene)-b-polystyrene triblock copolymers, which are obtained by hydrogenating polystyrene-b-poly(1,4-butadiene)-b-polystyrene and polystyrene-b-polyisoprene-b-polystyrene synthesized through anionic polymerization, are commercially available from Kraton. However, the types of polyolefins that can be obtained using this method are very limited, and the degree to which functional groups can be introduced remains very limited.

Therefore, as a result of having made intensive efforts to address the above-described problems, the inventors of the present invention confirmed that, when a polymer including oxygen atom-containing functional groups in side chains thereof was subjected to a deoxygenation reaction to thereby remove the functional groups of the side chains, only hydrocarbons remained, and thus various block copolymers including polyolefins and hydrocarbon polymers with complex architectures can be synthesized, and a novel hydrocarbon polymer material containing a functional polyolefin can be developed, thus completing the present invention.

SUMMARY OF THE INVENTION

Therefore, the present invention has been made in view of the above problems, and it is an object of the present invention to provide a method of synthesizing a hydrocarbon polymer using a deoxygenation reaction, the method being capable of synthesizing various block copolymers and polymers having complicated structures, which cannot be prepared using conventional techniques.

It is another object of the present invention to provide a novel functional polyolefin polymer group such as poly (ethylene-co-isobutylene) and poly(propylene-co-isobutylene), which cannot be prepared using existing methods.

In accordance with an aspect of the present invention, the above and other objects can be accomplished by the provision of a method of preparing a hydrocarbon polymer, the method including deoxygenating a hydrocarbon polymer precursor having side chains thereof with oxygen atom-containing functional groups bound thereto in the presence of a catalyst and a reducing agent to thereby remove the functional groups of the side chains.

In accordance with another aspect of the present invention, there is provided a hydrocarbon polymer including poly(methyl methylene), polystyrene-b-poly(propylene-co-allyl alcohol-co-allyl methyl ether-co-methyl acrylate), poly(ethylene-co-isobutylene), or poly(propylene-co-isobutylene).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which.

DETAILED DESCRIPTION OF THE INVENTION

Figure 1A:
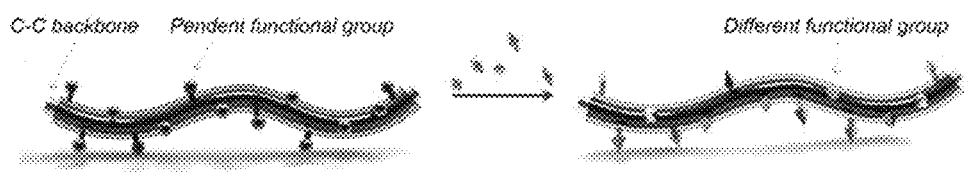
FIG. 1A illustrates a process of synthesizing PP by postpolymerization deoxygenation of PMA according to a typical postpolymerization process (i) and an embodiment of the present invention (ii)
Figure 1A:
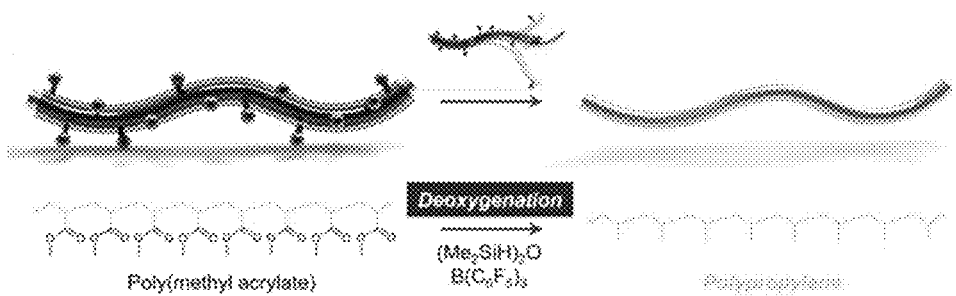

Unless defined otherwise, all technical and scientific terms as used herein have the same meanings as commonly understood by one of ordinary skill in the art to which the present invention pertains. Generally, the nomenclature used herein is well known in the art and commonly used.

According to the present invention, it has been confirmed that, in the case of using the deoxygenation reaction of a polymer containing oxygen atom-bearing functional groups in side chains thereof to remove the functional groups of the side chains, only hydrocarbons remain, thereby being capable of synthesizing hydrocarbon polymers such as various block copolymers including polyolefins.

Therefore, an embodiment of the present invention relates to a method of preparing a hydrocarbon polymer, including deoxygenating a hydrocarbon polymer precursor having side chains with oxygen atom-containing functional groups bound thereto in the presence of a catalyst and a reducing agent to thereby remove the functional groups of the side chains.

Hereinafter, the present invention will be described in detail.

In the present invention, the oxygen atom-containing functional groups may be ester, ether, or hydroxyl groups.

In the present invention, the hydrocarbon polymer may be a homopolymer or a copolymer, and preferably, the copolymer may be a block copolymer including a diblock copolymer or a triblock copolymer, a random copolymer, or an alternating copolymer. In addition, the hydrocarbon polymer may be an architecture-controlled polymer such as a star copolymer, a hyperbranched polymer or a statistical copolymer, but it is not limited thereto.

In the present invention, the hydrocarbon polymer precursor having side chains with oxygen atom-containing functional groups bound thereto may be at least one selected from the group consisting of poly(vinyl ester)s including poly(vinyl acetate), polyacrylates including poly(methyl acrylate), poly(ethyl acrylate), poly(isopropyl acrylate), poly(n-butyl acrylate), poly(2-ethylhexyl acrylate), poly(t-butyl acrylate), and poly(phenyl acrylate), polymethacrylates including poly(methyl methacrylate), polyfumarates including poly(dimethyl fumarate) and poly(isopropyl fumarate), poly(maleic anhydride) and its derivatives including poly(maleimide), poly(alkoxy carbonyl methylene)s including poly(ethoxy carbonyl methylene), poly(acrylamide)s including poly(dimethylacrylamide), poly(diethylacrylamide), poly(N-isopropylacrylamide), poly(methacrylamide)s including poly(dimethylmethacrylamide) and poly(N-vinylpyrrolidone).

In the present invention, the hydrocarbon polymer precursor having side chains with oxygen atom-containing functional groups bound thereto may further include a polymer precursor not capable of being deoxygenated. The polymer precursor not capable of being deoxygenated may be at least one selected from the group consisting of polystyrene, poly(t-butylstyrene), poly(a-methylstyrene), and poly(vinylpyridine).

In the present invention, the hydrocarbon polymer may be polyethylene, polypropylene, polyisobutylene, poly(methyl methylene), poly(ethylene-co-propylene), poly(ethylene-co-isobutylene), poly(propylene-co-isobutylene), polystyrene-b-polypropylene-b-polystyrene, poly(methyl methylene)-b-polystyrene, polyethylene-b-polystyrene, polystyrene-b-polyisobutylene-b-polystyrene, polystyrene-b-poly(propylene-co-allyl alcohol-co-allyl methyl ether-co-methyl acrylate), poly(allylamine), poly(2-methylprop-2-en-1-amine) or poly(ethyleneamine).

In the present invention, the catalyst may be a Lewis acid catalyst, and tris(pentafluoro phenyl)borane ($B(C_6F_5)_3$) may preferably be used, but it is not limited thereto.

In the present invention, the reducing agent may be at least one selected from the group consisting of 1,1,3,3-tetramethyldisiloxane (TMDS), diethylsilane, dimethylethylsilane, diphenylsilane, n-butylsilane, triethylsilane, pentamethyldisiloxane, dimethylsilane, benzyldimethylsilane, dimethylethylsilane, 1,1,3,3,5,5-hexamethyltrisiloxane, 1,1,3,3,3-pentamethyldisiloxane, and 1,1,1,3,5,5,5-heptamethyltrisiloxane, and preferably, 1,1,3,3-tetramethyldisiloxane may be used, but it is not limited thereto.

In the present invention, a new synthesis method is provided by changing a postpolymerization route for polyolefin synthesis using a well-defined vinyl polymer as a precursor. In this regard, a readily obtainable parent polymer is chemically modified to produce a target polymer, and the chain length and structure thereof are maintained (Gauthier, M. A. et al., Angew. Chem. Int. Ed. 2009, 48, 48-58). Vinyl polymer precursors with desired structures may be prepared using reversible addition-fragmentation chain transfer (RAFT) polymerization, which is a highly controlled radical polymerization technique, anionic polymerization, atomic transfer radical polymerization (ATRP), or the like (Moad, G. et al., J. Chem. 2012, 65, 985-1076). Thereafter, a target polyolefin may be obtained by removing oxygen-containing pendent groups via a deoxygenation reaction.

Figure 1B:
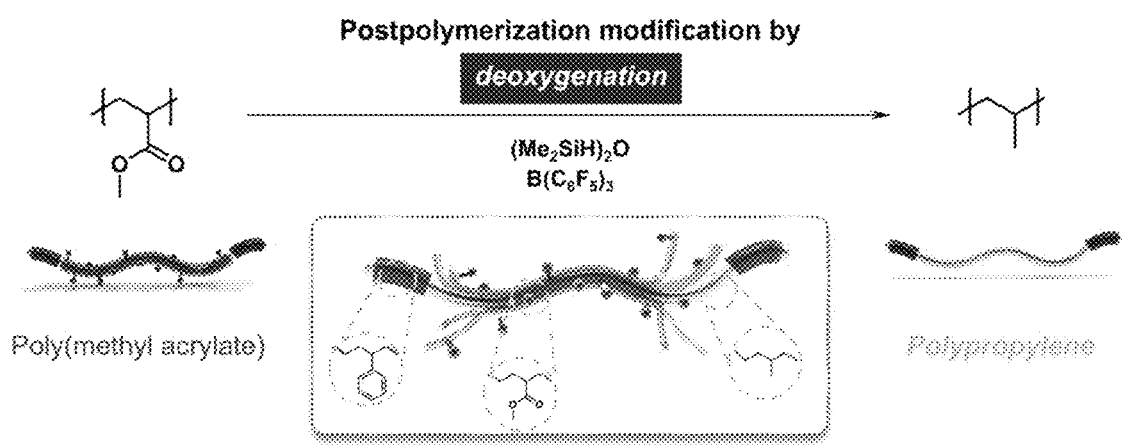
FIG. 1B is a view illustrating a process of synthesizing PP by postpolymerization deoxygenation of PMA according to an embodiment of the present invention.
Figure 1C:
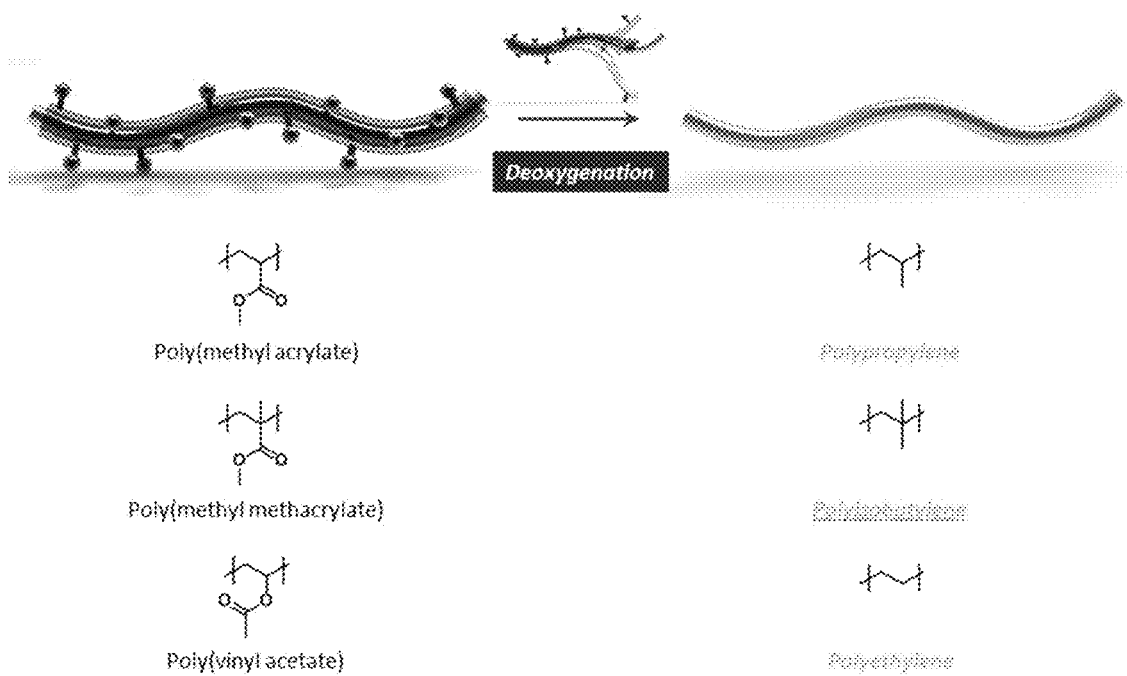
FIG. 1C is a view illustrating a process of synthesizing PP, polyisobutylene, and PE by postpolymerization deoxygenation of PMA according to an embodiment of the present invention.
Figure 1D:
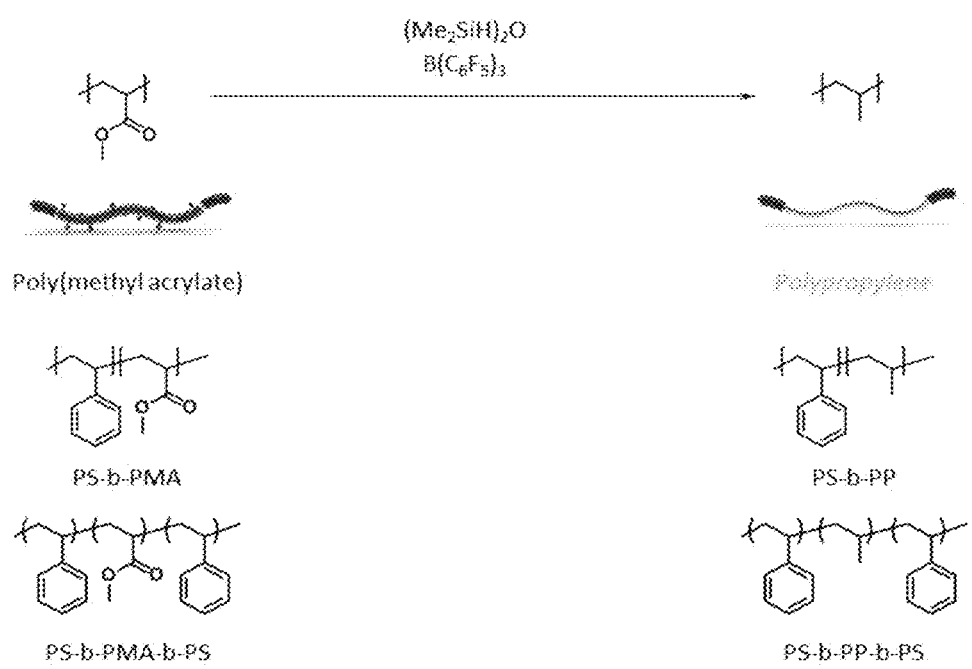
FIG. 1D is a view illustrating a process of synthesizing PS-b-PP and PS-b-PP-b-PS by postpolymerization deoxygenation of PMA according to an embodiment of the present invention.

As an embodiment of the present invention, the reaction route for synthesizing polypropylene (PP) from poly(methyl acrylate) (PMA) is schematically illustrated in FIG. 1A. FIG. 1B is a more detailed view illustrating a process of synthesizing PP by the postpolymerization deoxygenation of PMA according to an embodiment of the present invention, FIG. 1C is a view illustrating a process of synthesizing PP, polyisobutylene, and PE, and FIG. 1D is a view illustrating a process of synthesizing a PS-b-PP diblock copolymer and a PS-b-PP-b-PS triblock copolymer. In this regard, PMA is deoxygenated by a $B(C_6F_5)_3$ catalyst in the presence of 1,1,3,3-tetramethyldisiloxane to remove oxygen atoms of pendent groups, thereby producing hydrocarbon polymers such as PP.

Several postpolymerization methods have been reported to serve to produce polyolefins via the hydrogenation of an unsaturated hydrocarbon polymer synthesized by anionic polymerization (Yu, H. et al., Macromolecules 1999, 32, 4365-4374) or olefin metathesis polymerization (Wu, Z. et al., Macromolecules 1994, 27, 6700-6703).

Meanwhile, oxygen-containing vinyl monomers, such as vinyl esters, vinyl ethers, acrylates, and methacrylates, may be mainly used as precursors for the production of PE, PP, and polyisobutylene (PIB), and thus the deoxygenation route is very distinct. From the perspective of postpolymerization modification, the removal of functional groups to produce hydrocarbon polymers is very unique compared to typical postpolymerization modification reactions forming new covalent bonds with the addition of additional segments (Gauthier, M. A. et al., Angew. Chem. Int. Ed. 2009, 48, 48-58; Liu, D. et al., Polym. Int. 2017, 66, 70-76; Boaen, N. K. et al., Chem. Soc. Rev. 2005, 34, 267-275; Bae, C. et al., J. Am. Chem. Soc. 2015, 127, 767-776; Larsen, M. B. et al., J. Am. Chem. Soc. 2018, 140, 11911-11915; Easterling, C. P. et al., Chem. Sci. 2017, 8, 7705-7707; Bunescu, A. et al., ACS Cent. Sci. 2017, 3, 895-903). Nevertheless, the removal of aceto groups is commercially used in the synthesis of poly(vinyl alcohol) from poly(vinyl acetate) by controlling the degree of hydrolysis. Thus, the deoxygenation route may be particularly suitable for the synthesis of functional polyolefins, avoiding catalyst poisoning issues in the coordination copolymerization of olefinic monomers with polar monomers (Franssen, N. M. G. et al., Chem. Soc. Rev. 2013, 42, 5809-5832).

As the key deoxygenation reaction, the borane-catalyzed deoxygenation of acrylates using hydrosilane as a reducing agent has been the focus of attention (Oestereich, M. et al., Chem. Soc. Rev. 2015, 44, 2202-2220) Yamamoto et al. discovered the catalytic reactivity of tris(pentafluorophenyl) borane ($B(C_6F_5)_3$) with excess hydrosilanes (Gevorgyan, V. et al., Tetrahedron Lett. 1999, 40, 8919-8922), which can cleave a carbon-oxygen bond under mild conditions without requiring transition metals. Alcohols, esters, carboxylic acids, and ethers can be reduced to hydrocarbons with high efficiency by a reductive $B(C_6F_5)_3$ catalyst (Parks, D. J. et al., J. Am. Chem. Soc. 1996, 118, 9440-9441; Gevorgyan, V. et al., J. Org. Chem. 2000, 65, 6179-6186; Bézier, D. et al., Org. Lett. 2013, 15, 496-499. (2013); Feghali, E. et al., Catal. Sci. Technol. 2014, 8, 2230-2234). This finding has been expanded to several interesting chemical transformations, including the deoxygenation of carbohydrate into hydrocarbons (Adduci, A. L. et al., Angew. Chem. Int. Ed. 2014, 126, 1672-1675) and the depolymerizations of lignins, polyesters, and polyethers (Feghali, E. et al., ChemSusChem 2014, 8, 980-984). It can be anticipated that the highly reactive nature of the reductive $B(C_6F_5)_3$ catalyst (Kim, D. W. et al., Angew. Chem. Int. Ed. 2015, 54, 14805-14809) is suitable for the conversion of polyacrylates to PP in a controlled manner The present invention, which proposes approaches completely different from those of the related art, relates to a method of synthesizing various hydrocarbon polymers including polyolefins by removing, through the deoxygenation reaction of a polymer including, in side chains thereof, oxygen atom-containing functional groups, the functional groups of the side chains, thus allowing only hydrocarbons to remain.

This method has the following merits. 1) Since hydrocarbon polymers are induced using, as precursors, polymers including oxygen atom-containing functional groups in side chains thereof, when structurally well-controlled precursors are used, well-controlled hydrocarbon polymers may be obtained. Olefin monomers containing esters, ethers, or the like in side chains thereof stabilize anions or radicals well, and thus various block copolymers and polymers having complicated architectures may be produced through previously established anionic polymerization and controlled radical polymerization. Representatively, polyethylene may be obtained from poly(vinyl acetate), polypropylene may be obtained from poly(methyl acrylate), and polyisobutylene may be obtained from poly(methyl methacrylate). All of these precursors are commercially available polymers and controlled polymerization methods therefor are known. 2) By copolymerizing various olefinic monomers, new polyolefin polymer groups such as poly(ethylene-co-propylene), poly(ethylene-co-isobutylene), and poly(propylene-co-isobutylene), which have previously been unimaginable, may be synthesized. 3) Precursor polymers contain 100% of functional groups in all repeating units, and thus, by adjusting the degree of the deoxygenation reaction, functional hydrocarbon polymers having controlled functional group density may be obtained. 4) When polymers with ester groups bonded to all carbons in the main chain, such as poly(maleic acid) or poly(dimethyl fumarate), are used as precursors, a new method capable of producing new hydrocarbon polymers such as poly(methyl methylene), other than polyolefins, may be obtained.

As a strategy for an approach to polyolefin materials, which have previously been unapproachable, the defunctionalization of vinyl polymers has been proposed. By using $B(C_5F_5)_3$-catalyzed deoxygenation in the presence of silane, pendent esters may be removed from poly(methyl acrylate), thereby effectively preparing a hydrocarbon polymer with methyl pendants, i.e., polypropylene.

A polypropylene-b-polystyrene diblock copolymer and a polystyrene-b-polypropylene-b-polystyrene triblock copolymer may be successfully derived from poly(methyl acrylate)-containing block polymer precursors and exhibit very distinct material properties due to the chemical transformation thereof. This unique postpolymerization modification methodology can go beyond typical functional group conversion, and may approach a wide range of unprecedented polyolefin block polymers with a variety of functional groups.

In a specific embodiment, it was confirmed that, by using tris(pentafluoro phenyl) borane ($B(C_6F_5)_3$) as a Lewis acid catalyst and 1,1,3,3-tetramethyldisiloxane (TMDS) as a reducing agent, polypropylene and block copolymers thereof, which have controlled functional group density, can be obtained from poly(methyl acrylate) and a block copolymer of poly(methyl acrylate) and polystyrene.

As of 2018, the polyethylene market is huge, specifically S183,000,000,000, and the polypropylene market is huge, specifically 135,000,000,000. Among these, functional polyolefins, polyolefin copolymers, polyolefin elastomers, and the like are new polyolefin materials, and the importance thereof is increasing day by day. In particular, at the current time, when plastic recycling has emerged as one of the most important issues, it is worthwhile if functional polyolefins, which can greatly contribute to recycling by allowing polyolefins to be blended with other polymers, can be synthesized.

It can be predicted that it will be possible to pioneer and preoccupy the market via the development of novel functional polyolefins and hydrocarbon polymer materials, and to proceed to commercialization through technology transfer to domestic chemical firms that produce polyolefins.

PP and PP-containing block copolymers may be synthesized through deoxygenation of PMA and PMA-containing copolymers in the presence of a $B(C_6F_5)_3$ catalyst. By combining these with deoxygenation-inert polystyrene (PS), PP and PP-containing diblock and triblock copolymers may be successfully synthesized from PMA, PS-b-PMA, and PS-b-PMA-b-PS as precursors in deoxygenation transformations. In addition, functional PPs containing pendant hydroxyl groups may be prepared by adjusting the relative amount of hydrosilane to PMA repeating units, and it was also confirmed that the synthesized PS-b-PP-b-PS triblock copolymers exhibited elastic behavior as a thermoplastic elastomer due to microphase separation between PS and PP.

By the method of preparing hydrocarbon polymers through deoxygenation according to the present invention, a polymer of a polymer precursor, capable of being deoxygenated, or a hydrocarbon polymer, which is a polymer of a polymer precursor capable of being deoxygenated and a polymer precursor not capable of being deoxygenated, may be prepared.

In the present invention, the polymer precursor capable of being deoxygenated may be selected from the group consisting of poly(vinyl acetate), poly(methyl acrylate), poly(ethyl acrylate), poly(isopropyl acrylate), poly(n-butyl acrylate), poly(2-ethylhexyl acrylate), poly(t-butyl acrylate), poly(phenyl acrylate), poly(methyl methacrylate), poly(dimethyl fumarate), poly(isopropyl fumarate), poly(maleic acid), and poly(ethoxy carbonyl methylene), and the polymer precursor not capable of being deoxygenated may be selected from the group consisting of polystyrene, poly(t-butylstyrene), poly(a-methylstyrene), and poly(vinyl pyridine).

In particular, it was confirmed that poly(ethylene-co-isobutylene) or poly(propylene-co-isobutylene) copolymers, which cannot be synthesized using existing techniques, can be prepared using the preparation method according to the present invention.

Therefore, another embodiment of the present invention relates to poly(methyl methylene), polystyrene-b-poly(propylene-co-allyl alcohol-co-allyl methyl ether-co-methyl acrylate), poly(ethylene-co-isobutylene), or poly(propylene-co-isobutylene).

Hereinafter, exemplary examples will be described to aid in understanding of the present invention, but it will be obvious to those of ordinary skill in the art that the following examples are provided for illustrative purposes only and that various changes and modifications can be made within the scope and technical spirit of the present invention, and these changes and modifications should be construed as falling within the scope of the appended claims.

EXAMPLES

Example 1: Synthesis of Polypropylene Through Deoxygenation Reaction of Poly(Methyl Acrylate)

Reagents and Equipment

Methyl 2-methyl-3-propylpropionate (Kaise, H. et al., Org. Lett. 2014, 16, 727-729) and 2-(dodecylthiocarbothiosylthio)-2-methyl propionic acid (Lai, J. T. et al., Macromolecules 2002, 35, 6754-6756) were synthesized according to methods reported in previous studies. Styrene (99%) and methyl acrylate (99%) were purchased from Sigma-Aldrich and purified through an alumina column before polymerization. Azobisisobutyronitrile was purchased from Junsei, purified by recrystallization in methanol, and stored at −20° C. A 1.25 M hydrochloric acid/methanol solution, 1,1,3,3-tetramethyldisiloxane, tetrabutyl ammonium fluoride, isobutylbenzene, and butylbenzene were purchased from Sigma-Aldrich and used directly without purification. Tris (pentafluorophenyl)borane (98%) was purchased from Tokyo Chemical Industry and used without any purification. Toluene and chloroform were purchased from J.T. Baker, and were then used after purification using a solvent purification device.

The $^1H$ nuclear magnetic resonance spectra of the synthesized polymers were obtained using a Bruker AVANCE 300 MHz, and the dynamics of the deoxygenation reaction of the polymers were observed using Bruker 400 MHz equipment. The $^{13}C$ nuclear magnetic resonance spectra and three-phase difference spectra (distortionless enhancement by polarization transfer (DEPT)$^{13}C$ NMR) were obtained using Jeol JNM ECA600 600 MHz. The stereoregularity of the synthesized polypropylene was analyzed after obtaining a $^{13}C$ nuclear magnetic resonance spectrum from Bruker Advance 800 MHz in a 1,2,4-trichlorobenzene solvent. $^{13}C$-$^1H$ and $^1H$-$^1H$ two-dimensional nuclear magnetic resonance spectra were measured using a Varian Inova AS400 model.

The chromatograms were obtained using an Agilent 1260 Infinity model equipped with three PLgel 10 μm MIXED-B columns and a refractive index detector available from Optilab UT-rEX. As a solvent, chloroform was used at 35° C., and the molecular weight and dispersion degree of the polymer were calculated using an EasiCal polystyrene assay sample. The glass transition temperature of the polymer was measured at a temperature ranging from 50° C. to 150° C. while varying 10° C. per min using a TA DSC Q20 model as a differential scanning calorimeter. A small-angle X-ray scattering experiment was conducted in a 9A pole small-angle X-ray scattering (U-SAXS) beamline at the Pohang Accelerator Laboratory. The beam energy used was 19.95 KeV, and the distance between the polymer sample and the detector was set to 1.5 m for the experiment. The tensile strength test of polymer films was conducted by QURO Corp. QRS-S11H, and analysis was conducted after the size of each sample was adjusted to 50×10×0.5 mm.

Deoxygenation Reaction of Model Compound

Figure 4:
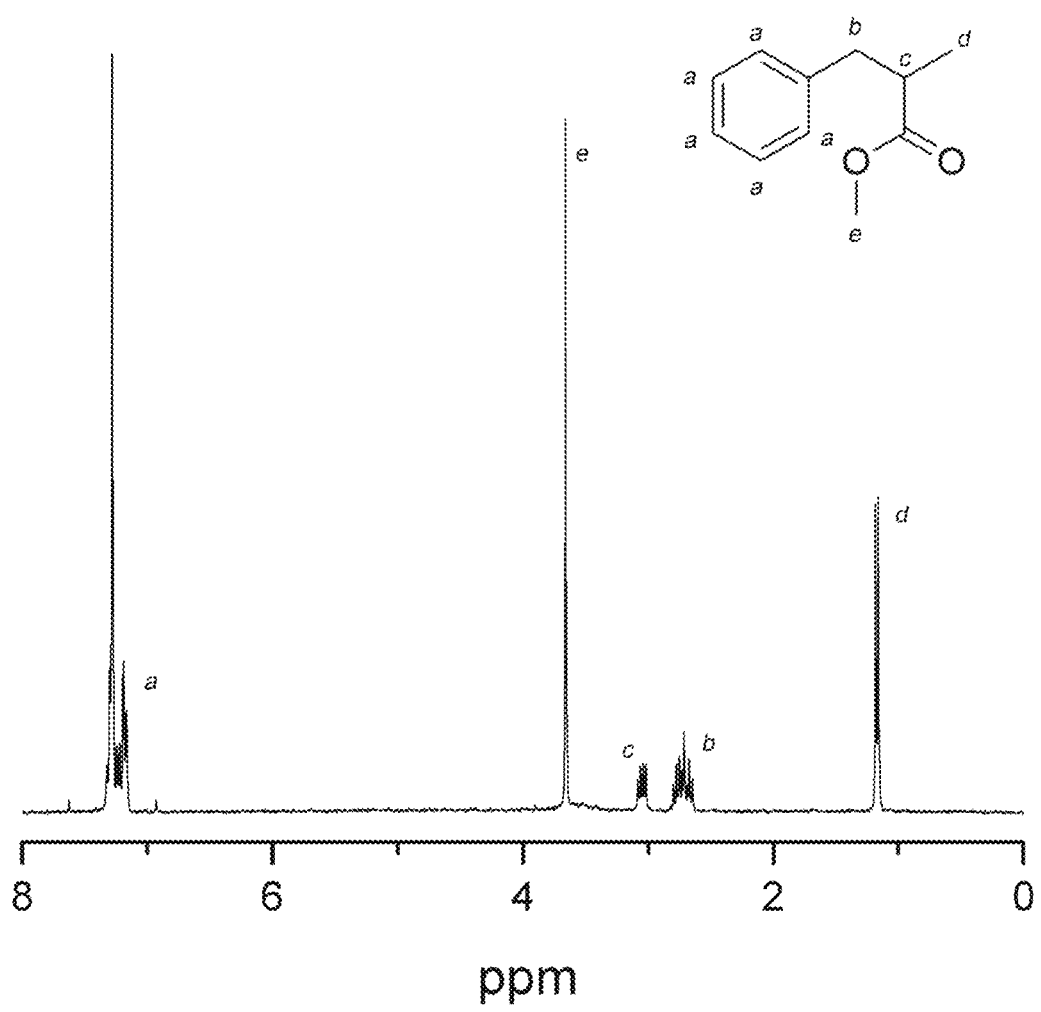
FIG. 4 illustrates a $^1$H nuclear magnetic resonance spectrum of a model compound according to an embodiment of the present invention.
Figure 5:
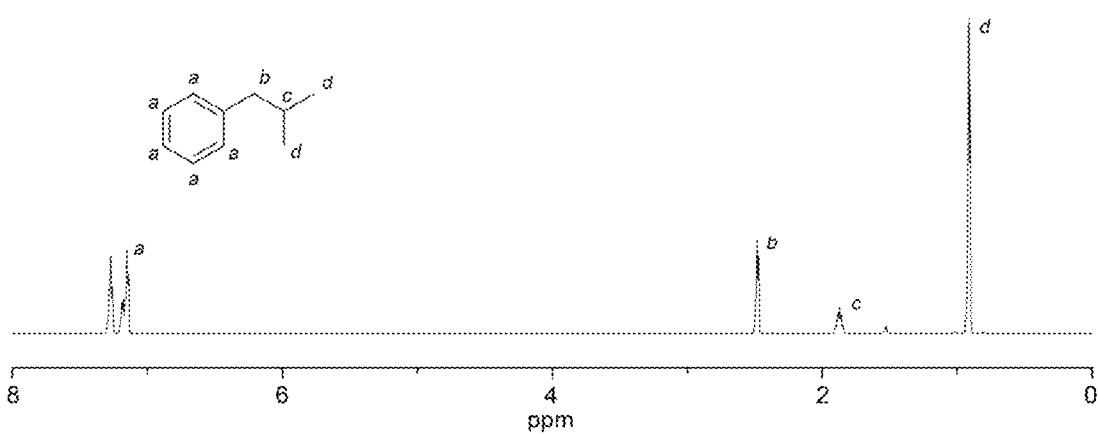
FIG. 5 illustrates $^1$H nuclear magnetic resonance spectra of products 4 and 5 according to an embodiment of the present invention, wherein (a) is isobutylbenzene and (b) is n-butylbenzene.
Figure 5:
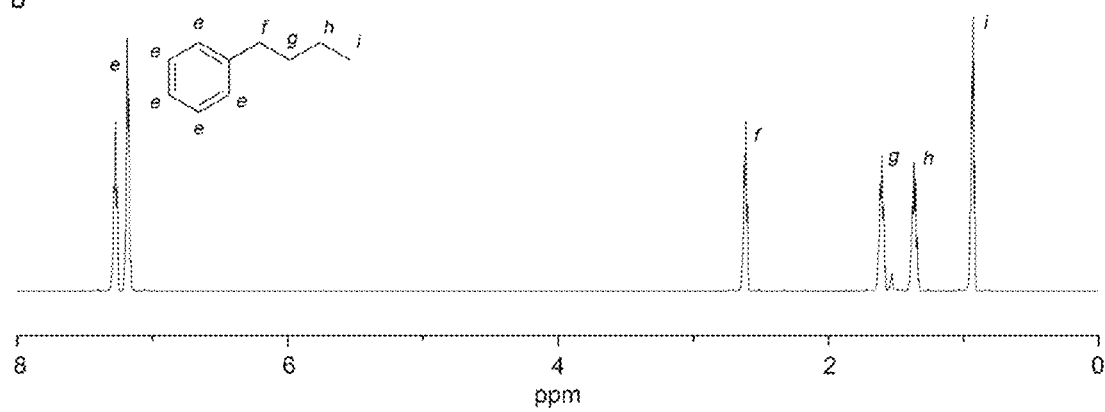
Figure 6:
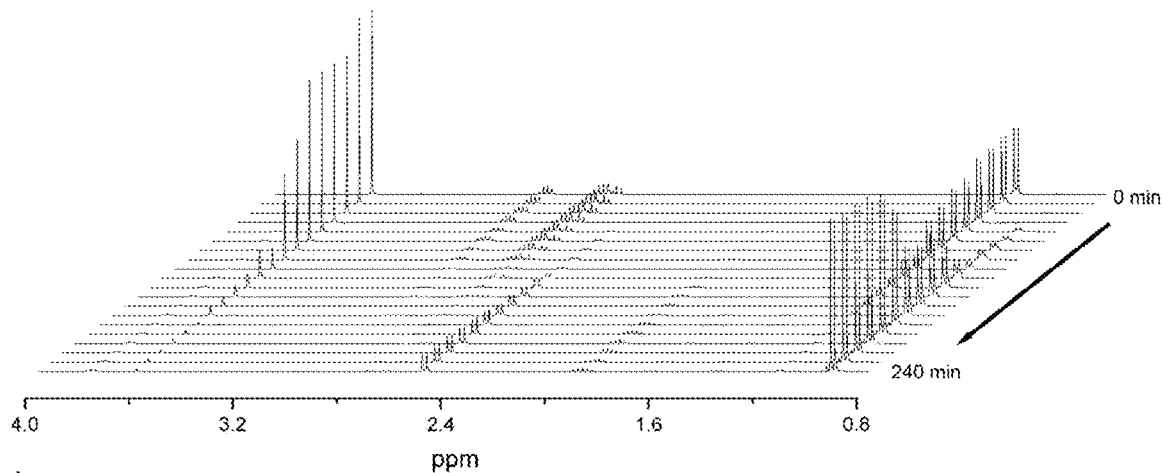
FIG. 6 illustrates in-situ nuclear magnetic resonance spectra according to an embodiment of the present invention, wherein (a) is a spectrum according to time in the range of 0.8-4 ppm, and (b) is spectra obtained after 0 min, 90 min, 180 min, and 240 min, respectively.
Figure 6:
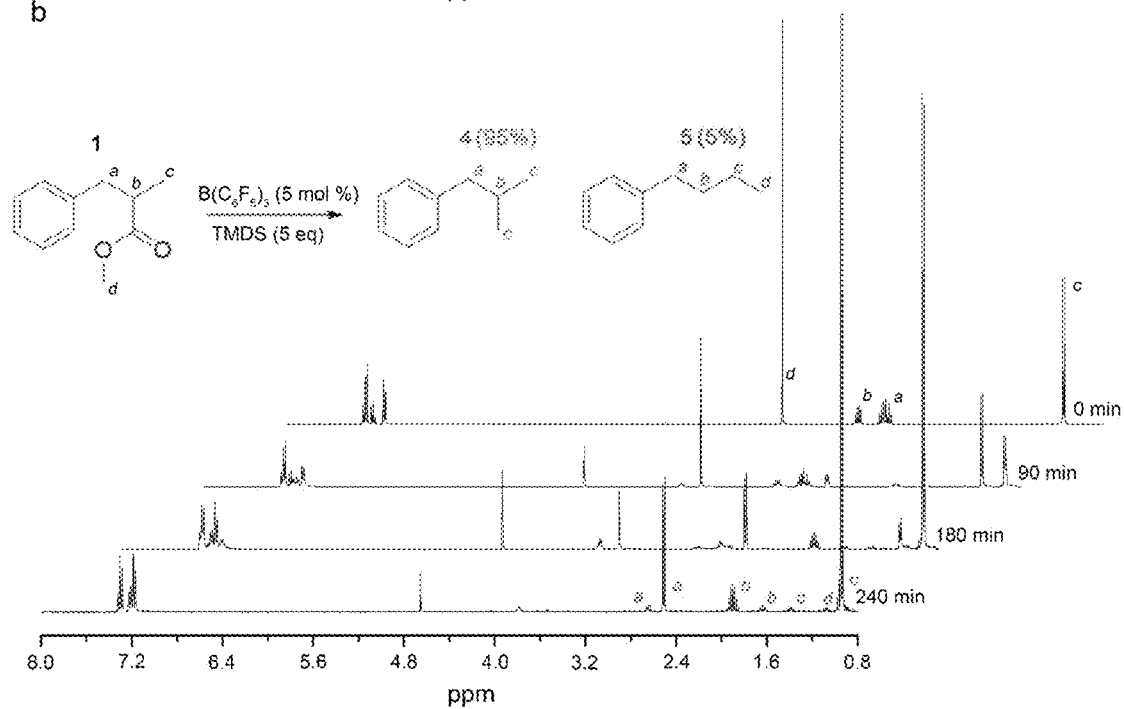

To determine the optimized deoxygenation reaction conditions, a deoxygenation reaction was conducted in the presence of a borane catalyst using various silanes and solvents. First, 0.1 g of methyl 2-methyl-3-phenylpropanoate (0.56 mmol), 0.014 g of a borane catalyst ($B(C_6F_5)_3$, 0.027 mmol), and 5 mL of chloroform ($CDCl_3$) were added to a 5 mL vial and stirred at room temperature until the resulting solution became a uniform solution. 5 equivalents of silane with respect to the model compound were slowly added to the reaction solution, which was then stirred overnight at room temperature or 60° C. After the reaction, compounds produced via nuclear magnetic resonance experiments were analyzed. The $^1$H nuclear magnetic resonance spectra of the used model compound and the produced compounds are illustrated in FIGS. 4 and 5, respectively, and various reaction conditions and the consequent results thereof are summarized in Table 1. Based on Table 2, it was concluded that condition 10, showing 96.1% of product 4, was the most optimized condition. In addition, the deoxygenation reaction process was analyzed by obtaining $^1$H nuclear magnetic resonance spectra for a total of 2 hours once a minute. The resulting spectra are illustrated in FIG. 6.

acrylate monomer, 4 mg of azobisisobutyronitrile, and 2.1 g of toluene were added to a 50 mL shrink flask to prepare a homogeneous polymerization solution, followed by three cycles of freeze-pump-thaw. After the polymerization reaction at 70° C. for 7 hours, a polymer was obtained through precipitation in methanol and finally dried in a vacuum oven for 1 day to recover polystyrene-b-poly(methyl acrylate). It was confirmed through nuclear magnetic resonance analysis that the molecular weight of the synthesized polymer was 18 kg mol$^{-1}$.

Finally, polystyrene-b-poly(methyl acrylate)-b-polystyrene was synthesized by polymerizing the above-synthesized polystyrene-b-poly(methyl acrylate) with styrene. A homogenous polymerization solution including 2.3 g of styrene monomer, 2 g of a polystyrene-b-poly(methyl acrylate) macro chain transfer agent, 0.3 mg of azobisisobutyronitrile, 4.6 g of toluene, and 0.1 mL of a 1,4-dioxane was

TABLE 1

| Sample | Silane[a] | Solvent | Temperature (° C.) | Reaction time (h) | 4 (%)[b] | 5 (%)[b] |
|---|---|---|---|---|---|---|
| 1 | DES | CHCl$_3$ | RT | 24 | 92.4 | 7.6 |
| 2 | DES | CHCl$_3$ | 60 | 24 | 88.6 | 11.4 |
| 3 | DES | Toluene | RT | 24 | 93.2 | 6.8 |
| 4 | DES | Benzene | RT | 24 | 92.6 | 7.4 |
| 5 | DES | Dichlorobenzene | RT | 24 | 71.8 | 28.2 |
| 6 | TES | CHCl$_3$ | RT | 24 | — | — |
| 7 | DPS | CHCl$_3$ | RT | 24 | 86.0 | 14.0 |
| 8 | PMDS | CHCl$_3$ | RT | 24 | 89.2 | 10.8 |
| 9 | TMDS | CHCl$_3$ | RT | 24 | 90.0 | 10.0 |
| 1 | TMDS | Toluene | RT | 24 | 96.1 | 3.9 |

[a]DES: diethylsilane; TES: triethylsilane; DPS: diphenylsilane; PMDS: pentamethylsiloxane; TMDS: tetramethyldisiloxane
[b]The molar ratio between 4 and 5 was calculated from the $^1$H nuclear magnetic resonance spectra.

Synthesis of Poly(Methyl Acrylate)-Containing Polymer Precursors

Synthesis of Polystyrene-b-Poly(Methyl Acrylate)-b-Polystyrene (SMS(8-10-4))

Figure 7:
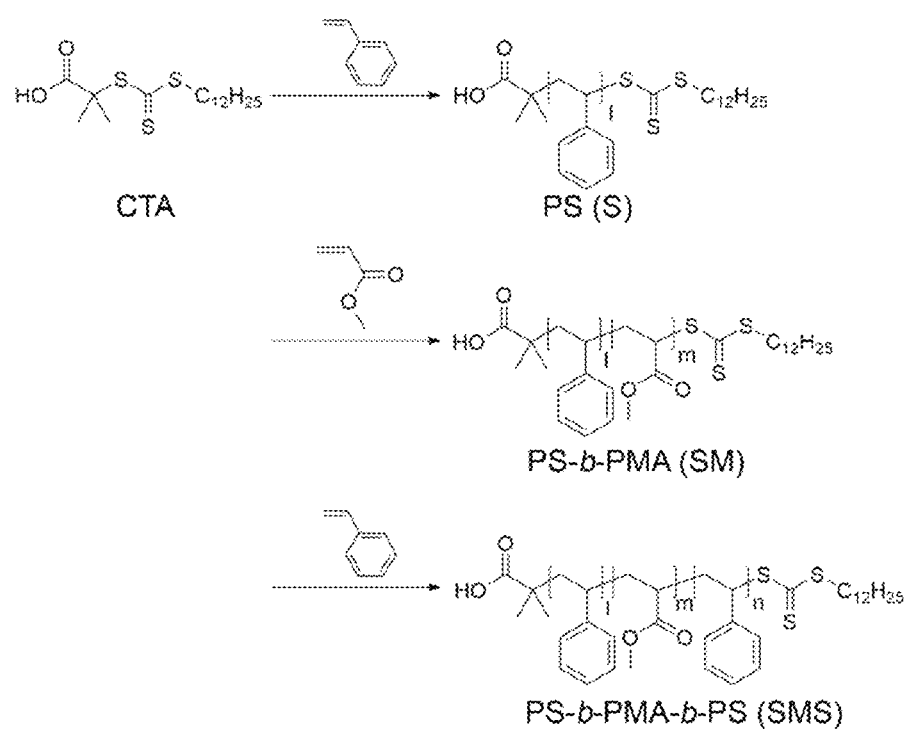
FIG. 7 is a reaction scheme illustrating the synthesis route to polystyrene-b-poly(methyl acrylate)-b-polystyrene according to an embodiment of the present invention.

Polystyrene-b-poly(methyl acrylate)-b-polystyrene was synthesized through the synthetic route illustrated in FIG. 7. First, polystyrene was synthesized, and methyl acrylate and styrene were sequentially polymerized to synthesize a triblock copolymer.

First, polystyrene was polymerized using the following method. 10 g of styrene and 0.29 g of a chain transfer agent (CTA) were added to a 50 mL shrink flask to prepare a homogeneous polymerization solution. After three freeze-pump-thaw cycles, the mixture was placed in an oil bath at 120° C., followed by a polymerization reaction for 7 hours. Thereafter, the flask was cooled to room temperature and then precipitated in methanol to obtain a polymer. Finally, after drying in a vacuum, the polymer was recovered. It was confirmed through size exclusion chromatography that the molecular weight of the polymer was 8 kg mol$^{-1}$.

Figure 8:
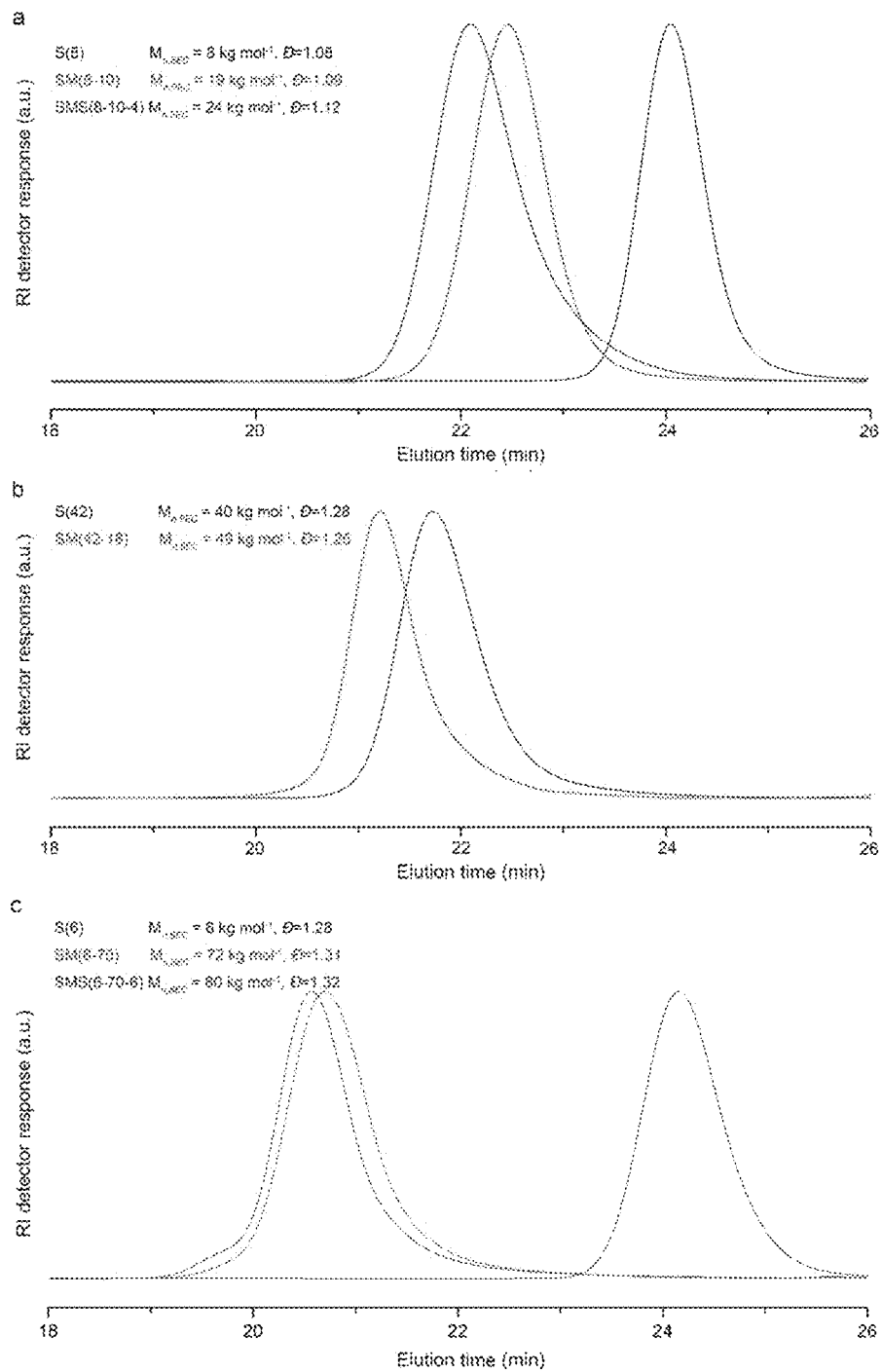
FIG. 8 illustrates size exclusion chromatograms of poly(methyl acrylate)-containing polymer precursors according to an embodiment of the present invention, wherein (a) SMS(8-10-4), (b) SM(42-18), and (c) SMS(6-70-6)

Polystyrene-b-poly(methyl acrylate) was obtained by polymerizing methyl acrylate on a polystyrene-macro chain transfer agent. The experiment was performed in the same manner as the aforementioned experimental processes. 1 g of a polystyrene-macro chain transfer agent, 2.1 g of methyl subjected to three cycles of freeze-pump-thaw, followed by polymerization at 90° C. overnight. In the same manner as the above-described processes, precipitation in methanol was performed, followed by drying in a vacuum oven, thereby synthesizing polystyrene-b-poly(methyl acrylate)-b-polystyrene. It was confirmed through nuclear magnetic resonance analysis that the molecular weight of the polymer was 22 kg mol$^{-1}$. The size exclusion chromatogram of the synthesized triblock copolymer is illustrated in FIG. 8A.

Synthesis of Polystyrene-b-Poly(Methyl Acrylate) (SM (42-18))

The experiment was conducted in the same manner as the aforementioned processes, except that the ratio of the monomer and the chain transfer agent that were used was varied. 42 kg mol$^{-1}$ of polystyrene was synthesized through polymerization using 20 g of styrene monomer and 0.069 g of a chain transfer agent at 120° C. for 3 hours. In addition, 3 g of the synthesized polystyrene as a macropolymerization chain transfer agent, 4.9 g of methyl acrylate monomer, 3 mg of azobisisobutyronitrile, and 4.9 g of toluene were allowed to react at 70° C. for 2 hours, thereby synthesizing polystyrene-b-poly(methyl acrylate) having molecular weights of 42 kg mol$^{-1}$ and 18 kg mol$^{-1}$, respectively. The size exclusion chromatogram of the synthesized diblock copolymer is illustrated in FIG. 8B.

Synthesis of Poly(Methyl Acrylate) (M(10))

Poly(methyl acrylate) was synthesized in the same manner as the aforementioned processes. A polymer polymerization solution including 10 g of methyl acrylate monomer, 85 mg of a chain transfer agent, and 10 μg of azobisisobutyronitrile was allowed to react at 70° C. for 2 hours, thereby synthesizing poly(methyl acrylate) having a molecular weight of 10 kg mol$^{-1}$.

Synthesis of High-Molecular-Weight Polystyrene-b-Poly (Methyl Acrylate)-b-Polystyrene (SMS(6-70-6))

To confirm a change in physical properties, a poly(methyl acrylate)-containing triblock copolymer with a high molecular weight was synthesized. Through the same processes as those described above, a polymer, in which the molecular weights of polystyrene, poly(methyl acrylate), and polystyrene are 6 kg mol$^{-1}$, 70 kg mol$^{-1}$, and 6 kg mol$^{-1}$, respectively, was synthesized. The size exclusion chromatogram of the synthesized triblock copolymer is illustrated in FIG. 8C.

Deoxygenation Reaction of Poly(Methyl Acrylate)-Containing Polymer Precursors

The process of the deoxygenation reaction of SMS(8-10-4) polymer precursor as a representative example will be described. In a 50 mL one-neck round flask, 0.1 g of SMS(8-10-4) (number of poly(methyl acrylate) units: 0.53 mmol) and 0.013 g of tris(pentafluorophenyl)borane (0.026 mmol, 5 mol % of the number of poly(methyl acrylate) units) were dissolved in 5 mL of toluene to prepare a uniform mixture. Subsequently, 0.71 g of 1,1,3,3-tetramethyldisiloxane (5.3 mmol, 5 equivalents of the number of poly(methyl acrylate) units) was slowly added to the reaction solution and stirred at room temperature overnight. The reaction was terminated by adding 2 mL of a 1.25M hydrochloric acid/methanol solution to the reaction solution. Thereafter, 3 mL of a solution in which 1.25 M tetrabutyl ammonium fluoride was dissolved in tetrahydrofuran was added to the resulting reaction solution, followed by stirring at room temperature for 12 hours. Then, after precipitating in methanol, the precipitate was filtered and recovered. Finally, the resulting product was dried in a vacuum overnight, thereby obtaining a polymer. The deoxygenation reaction was also performed on the diblock copolymer of polystyrene-b-poly(methyl acrylate) and the homopolymer of poly(methyl acrylate) using the same method as described above.

Figure 9:
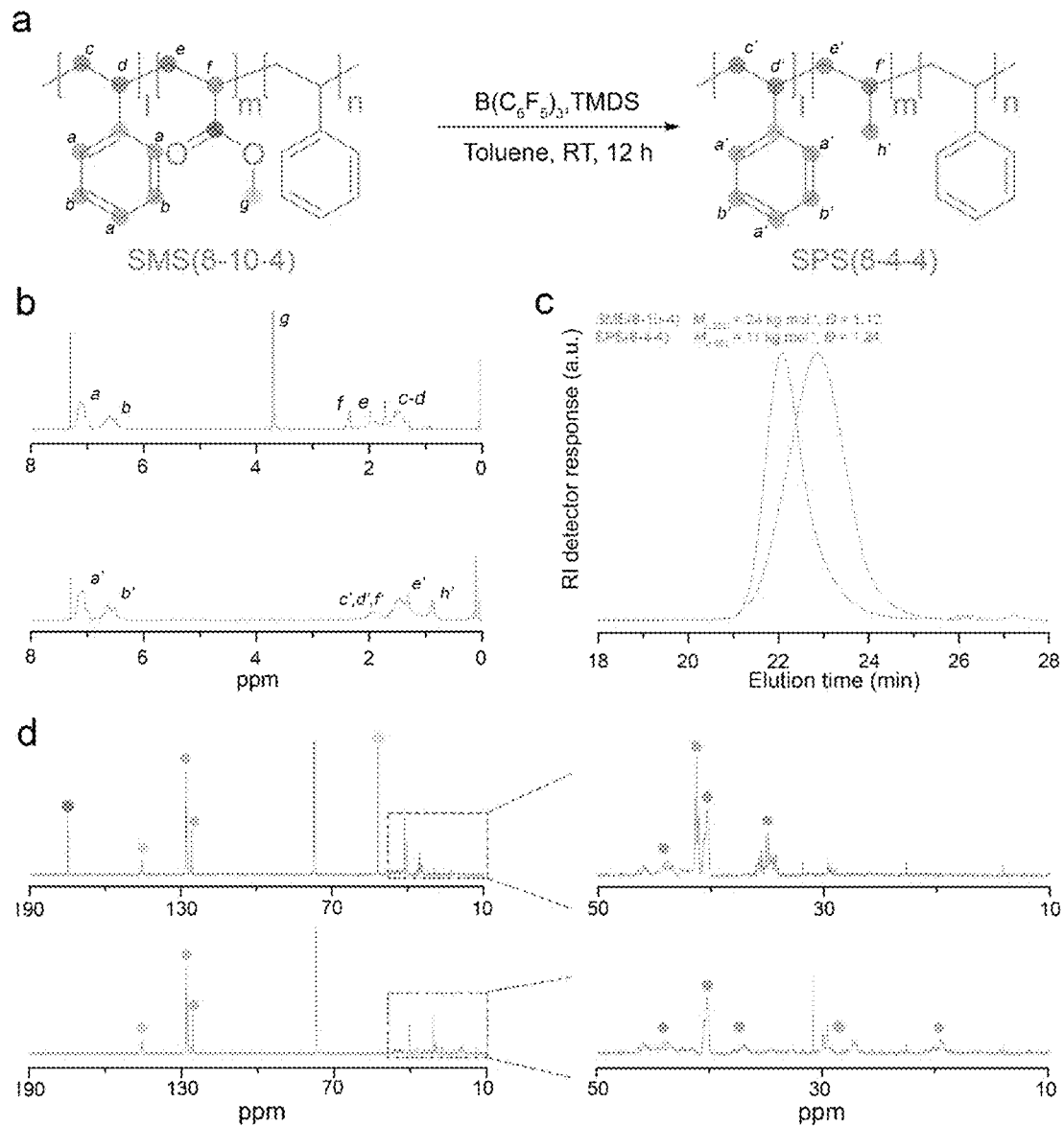
FIG. 9 illustrates (a,b) $^1$H nuclear magnetic resonance spectra of polymers analyzed after the deoxygenation reaction of a diblock copolymer of polystyrene-b-poly(methyl acrylate) and a homopolymer of poly(methyl acrylate), and (c,d) size exclusion chromatograms thereof, according to an embodiment of the present invention.

FIG. 9 illustrates $^1$H nuclear magnetic resonance spectra and size exclusion chromatograms of the diblock copolymer of polystyrene-b-poly(methyl acrylate) and the homopolymer of poly(methyl acrylate), the spectra and chromatograms being analyzed after the deoxygenation reaction thereof.

Figure 10:
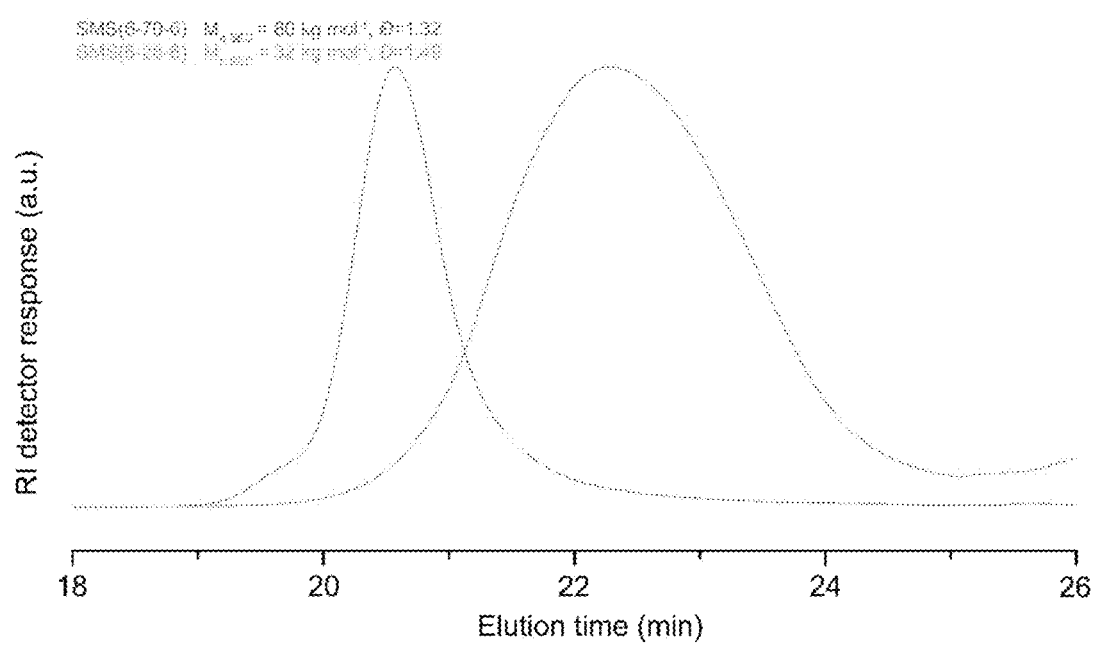
FIG. 10 illustrates a chromatogram of SMS(6-70-6) and a chromatogram after the deoxygenation reaction thereof, according to an embodiment of the present invention.

In the case of SM(6-70-6), a large-scale reaction was performed using different experimental settings. In a 1 L three-neck round flask, 5 g of SMS(6-70-46) (number of poly(methyl acrylate) units: 46.2 mmol) and 1.18 g of tris(pentafluorophenyl)borane (2.31 mmol, 5 mol % of the number of poly(methyl acrylate) units)) were dissolved in 300 mL of toluene to prepare a uniform mixture. Then, nitrogen gas was introduced to set the internal conditions to a stable state, and then the internal temperature was set to 0° C. Thereafter, 31 g of 1,1,3,3-tetramethyldisiloxane (231 mmol, 5 equivalents of the number of poly(methyl acrylate) units) was slowly added to the reaction solution for 6 hours. The reaction was allowed to occur at room temperature overnight, and then 100 mL of a 1.25 M hydrochloric acid/methanol solution was slowly added to the reaction solution for 3 hours, thereby terminating the reaction. In addition, 50 mL of a solution in which 1.25 M tetrabutyl ammonium fluoride was dissolved in tetrahydrofuran was added to the resulting reaction solution, followed by stirring at room temperature for 12 hours. Finally, the polymer was precipitated in methanol, recovered by filtration, and dried in a vacuum oven, thereby obtaining a polymer. The size exclusion chromatogram of SMS(6-70-6) and the size exclusion chromatogram after the deoxygenation thereof are illustrated in FIG. 10.

Partial Deoxygenation Reaction

Partial Deoxygenation Reaction of Polystyrene-b-Poly (Methyl Acrylate) Diblock Copolymer (SP$_{0.47}$(42-13))

SM(42-18) will be described as a representative example. 0.1 g of SM(42-18) (number of poly(methyl acrylate) units: 0.348 mmol) and 8.9 mg of tris(pentafluorophenyl)borane (0.0017 mmol, 5 mol % of the number of poly(methyl acrylate) units) were dissolved in 5 mL of toluene to prepare a uniform mixture. Subsequently, 0.047 g of 1,1,3,3-tetramethyldisiloxane (0.348 mmol, 1 equivalent of the number of poly(methyl acrylate) units) was slowly added to the reaction solution and stirred at room temperature overnight. The reaction was terminated by adding 2 mL of a 1.25 M hydrochloric acid/methanol solution to the reaction solution. Then, 3 mL of a solution in which 1.25 M tetrabutyl ammonium fluoride was dissolved in tetrahydrofuran was added to the resulting reaction solution, followed by stirring at room temperature for 12 hours. After precipitating in methanol, the precipitate was filtered and recovered. Finally, the resulting product was dried in a vacuum overnight, thereby obtaining a polymer.

Figure 11:
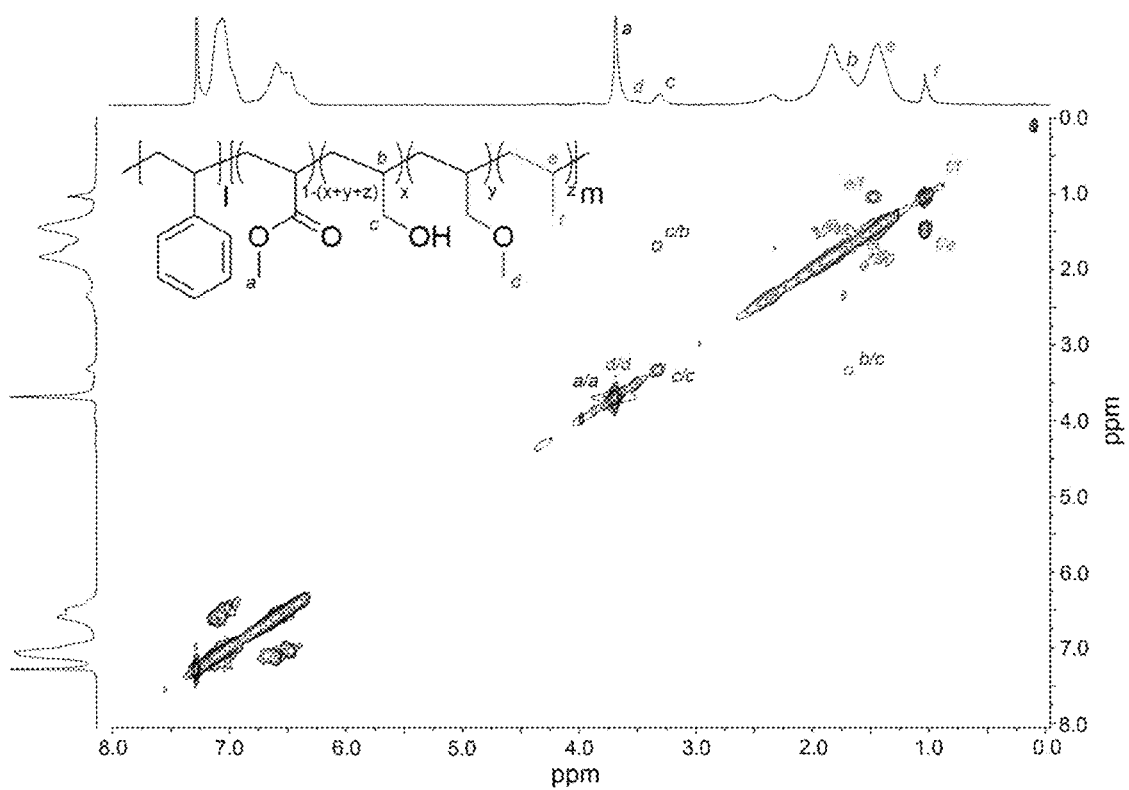
FIG. 11 illustrates a $^1$H-$^1$H two-dimensional nuclear magnetic resonance spectrum analyzed after a partial deoxygenation reaction according to an embodiment of the present invention.
Figure 12:
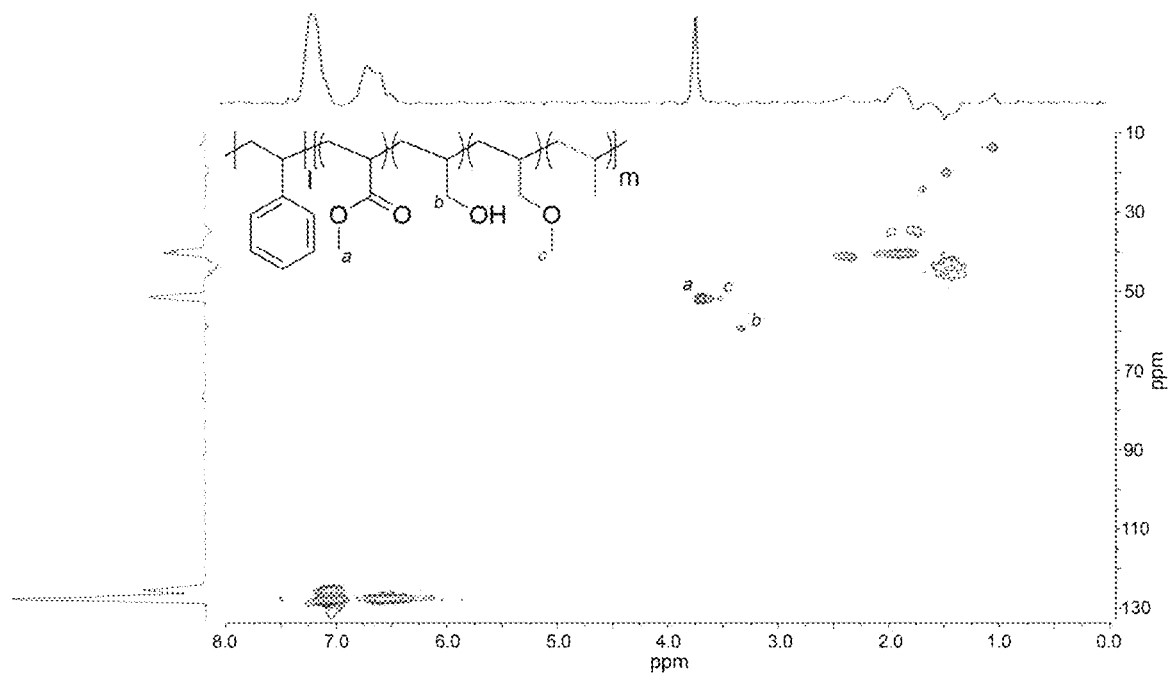
FIG. 12 illustrates a $^1$H-$^{13}$C two-dimensional nuclear magnetic resonance spectrum analyzed after a partial deoxygenation reaction according to an embodiment of the present invention.
Figure 13:
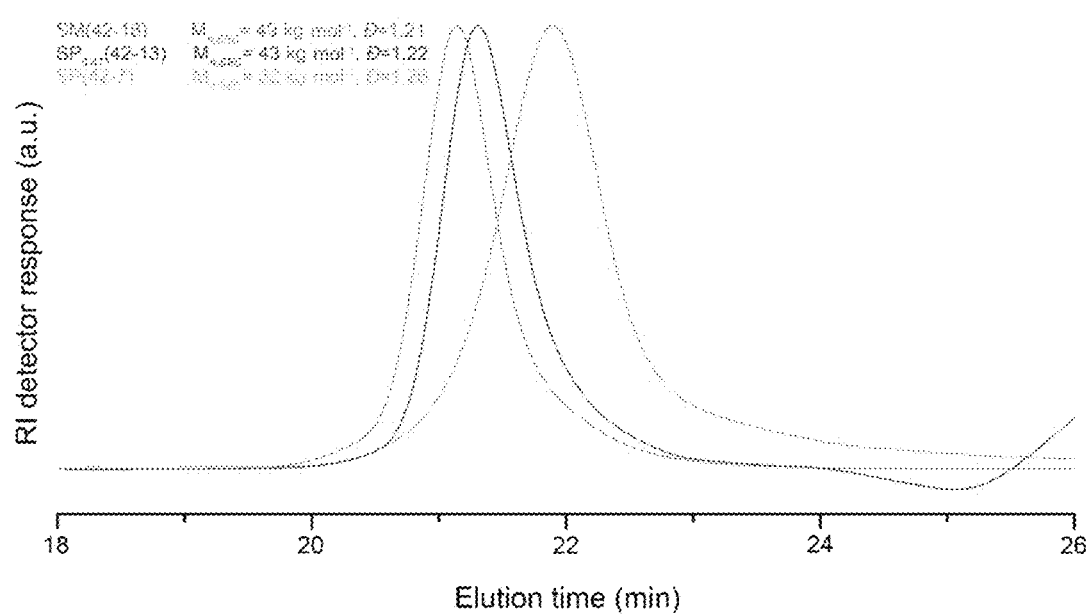
FIG. 13 is a graph showing SEC tracking of SP$_{0.47}$(42-13) according to an embodiment of the present invention, wherein the tracking of SM(42-18) and SP(42-7) are shown for reference.

By variously adjusting the amount of 1,1,3,3-tetramethyldisiloxane used (0.047 g (1 equivalent) and 0.070 g (1.5 equivalents), a partial deoxygenation reaction was performed, and polypropylene with partially introduced functional groups was synthesized therefrom. Through the $^1$H nuclear magnetic resonance spectra, it was analyzed that allyl alcohol repeating units, methylether repeating units, methyl acrylate repeating units, and propylene repeating units were present in the polymer in amounts of 8.5%, 4.1%, 40%, and 47%, respectively. The molar ratio thereof could be estimated through integral values of the nuclear magnetic resonance spectra, and the polypropylene repeating units was calculated by subtracting the integral value of the other repeating units from an integral value of 0.8-2.5 ppm. The $^1$H-$^1$H and $^1$H-$^{13}$C two-dimensional nuclear magnetic resonance spectra, measured to analyze each repeating unit therefrom, are illustrated in FIGS. 11 and 12, respectively. Also, the size exclusion chromatograms of the synthesized polymers are illustrated in FIG. 13.

The deoxygenation reaction of methyl 2-methyl-3-phenylpropanoate (1) as a model substrate containing methyl acrylate and styrene functional groups was investigated (see FIG. 4). The screening of hydrosilanes and solvents showed that the use of 1,1,3,3-tetramethyldisiloxane (TMDS) in chloroform and toluene at room temperature was the most effective (see Table 1). The $^1$H nuclear magnetic resonance (NMR) spectra illustrated in FIG. 3B clearly demonstrate that, by using 4 equivalents of TMDS in CDCl$_3$ in the presence of B(C$_6$F$_5$)$_3$ (5 mol %), the methylester moiety is effectively cleaved, as evidenced by the complete disappearance of methyl ester protons. The B(C$_6$F$_5$)$_3$-activated addition of Me$_2$SiH group to carbonyl oxygen initiates deoxygenation to initially produce methyl ether (Feghali, E. et al., Catal. Sci. Technol. 2014, 8, 2230-2234), which is subsequently deoxygenated to produce methyl groups in the presence of excess TMDS. As a result, isobutylbenzene (4) was formed at a yield of 95%, determined by $^1$H NMR spectra (see FIGS. 5 and 6). These results indicate that the methyl ester in methyl acrylate units is highly reactive to the deoxygenation reaction, while styrene units are fully intact. It was also found that a small amount of n-butylbenzene (5) (≤5%) had a possibility of being concurrently formed.

Figure 2:
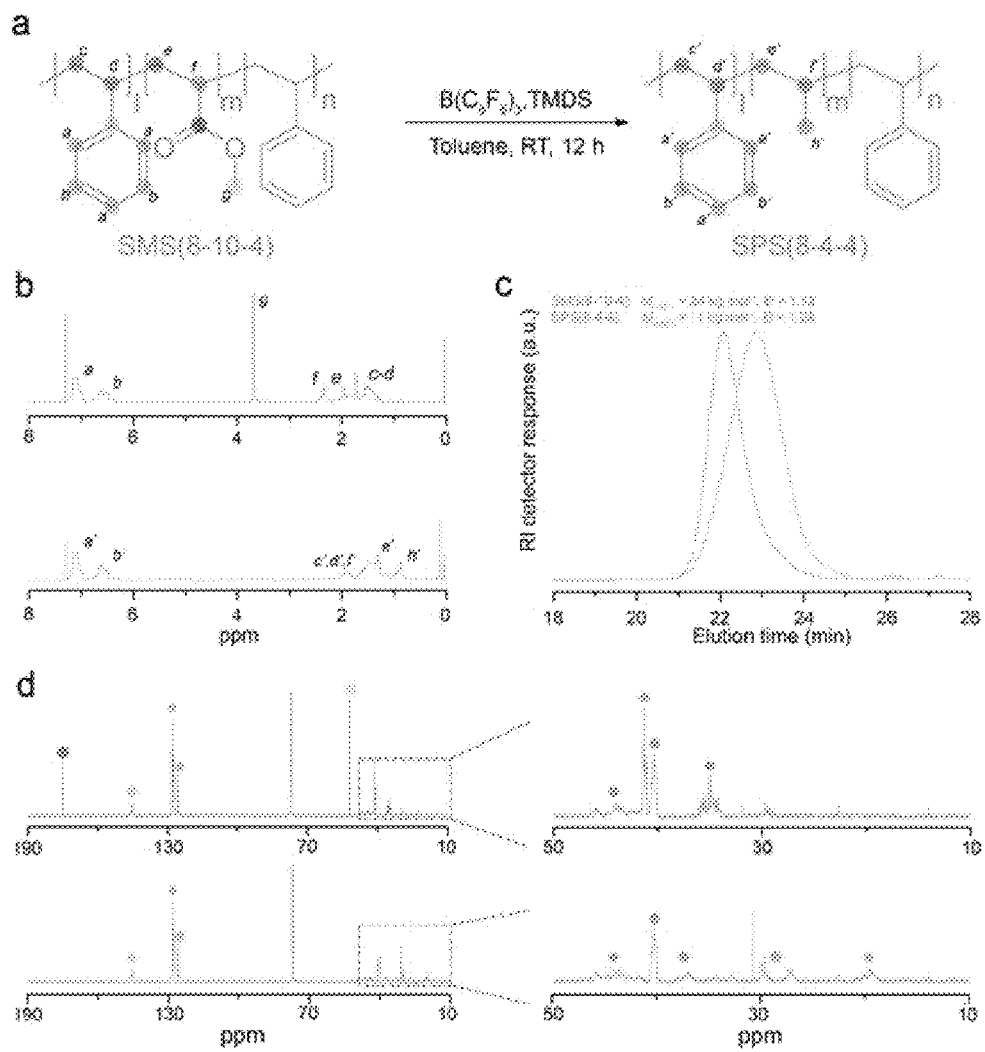
FIG. 2 illustrates (a) the synthesis route to PS-b-PP-b-PS by deoxygenation of PS-b-PMA-b-PS, and illustrates (b-d) $^1$H NMR (b), SEC (c), and $^{13}$C NMR data (d) of SPS(8-4-4) (orange), compared with a parent SMS(8-10-4) (blue)

Based on the possibility of the model compound, the deoxygenation reaction of PMA using a PS-b-PMA-b-PS triblock copolymer was tested to confirm whether the corresponding PS-b-PP-b-PS can also be produced (see FIG. 2). The parent PS-b-PMA-b-PS was synthesized by the sequential RAFT polymerization of styrene, methyl acrylate, and styrene using S-1-dodecyl-S'—(R,R'-dimethyl-R"-acetic acid)trithiocarbonate (Lai, J. T. et al., Macromolecules 2002, 35, 6754-6756) as a chain transfer agent (CTA) (see FIGS. 7 and 8A). Samples are denoted in parentheses according to the constituent blocks of polymers (S for PS, M for PMA, and P for PP) and molar mass (kg mol$^{-1}$).

FIG. 2 illustrates $^1$H and $^{13}$C NMR spectra and size exclusion chromatography (SEC) data of SPS (8-4-4) obtained through the deoxygenation of SMS(8-10-4). The reaction was performed in toluene at room temperature for 12 hours in the presence of 5 mol % B(C$_6$F$_5$)$_3$ and 10 eq TMDS, and compared to PMA repeating units (see FIG. 2A). The $^1$H NMR spectrum of SPS(8-4-4) of FIG. 2B clearly shows that the methyl ester proton of the PMA repeating unit completely disappears at 3.7 ppm. Instead, a new peak corresponding to the methyl proton in the PP repeating unit appears at 1.2 ppm, supporting the formation of PP from PMA. It was shown that aliphatic protons corresponding to the atactic PMA backbone at 2.1 ppm and 2.4 ppm also completely disappeared after the reaction, and that new protons corresponding to the PP backbone were increased at 1.3 ppm. PS aromatic protons and aliphatic protons appear as broad peaks at 6.0-7.2 ppm and 1-2 ppm, respectively. The SEC tracking of the produced polymer indicated a clear shift to a lower molar mass from 24 kg mol$^{-1}$ to 11 kg mol$^{-1}$ while retaining relatively narrow molar mass distribution and supporting a reduction in mass by the removal of ester groups (see FIG. 2C). Peaks corresponding to protons in the CTA moiety were not distinguishable in the $^1$H NMR spectrum of SPS(8-4-4). This is probably due to simultaneous removal of trithiocarbonate groups during the deoxygenation reaction (Saito, K. et al., Org. Lett. 2015, 17, 3366-3369).

Figure 14:
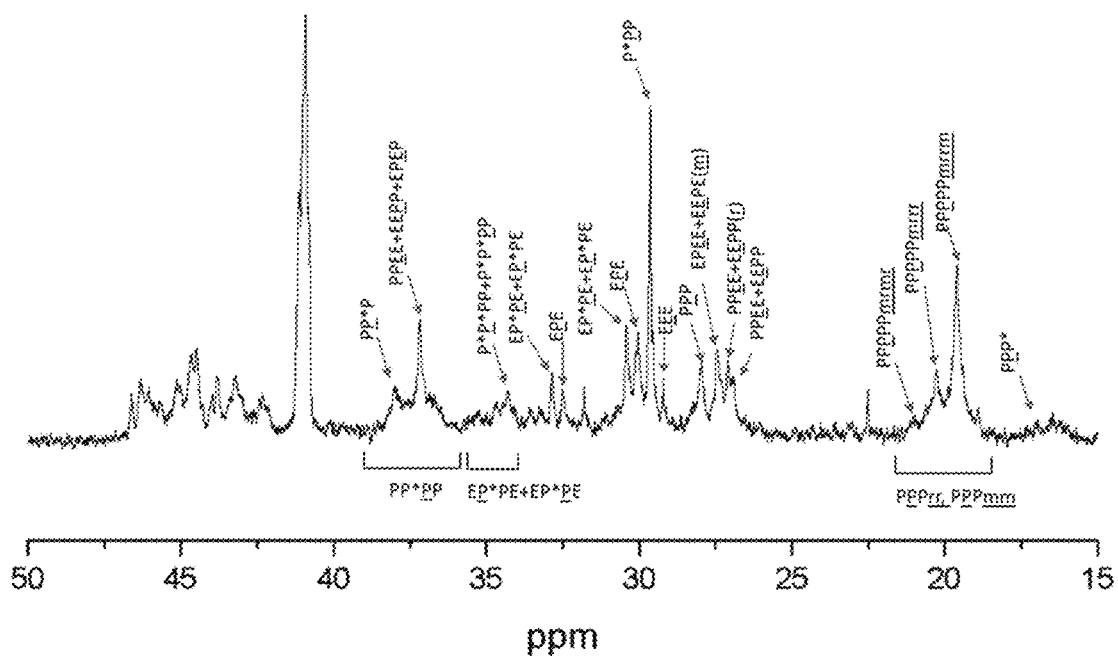
FIG. 14 is a $^{13}$C NMR spectrum of SPS(8-4-4) obtained at 90° C. (1,2,4-trichlorobenzene-d$_3$, 800 MHz), according to an embodiment of the present invention.

The $^{13}$C NMR spectrum of SPS (8-4-4) supports the formation of PP (see FIG. 2D). All peaks were assigned on the basis of distortionless enhancement by polarization transfer (DEPT) spectra (see FIG. 9). Peaks corresponding to carbonyl (178 ppm) and methyl (52 ppm) carbons in the methyl ester of the PMA repeating unit completely disappeared, and PP carbons appeared in the range of 15 ppm to 45 ppm. Meanwhile, no change was observed in the peaks corresponding to PS. Based on the assigned task in the literature (Galland, G. B. et al., J. Polym. Sci. Part A: Polym. Chem. 2004, 42, 2171-2178), it was confirmed that atactic PP with defects of less than 7%, such as ethylene repeating units, was obtained (see FIG. 14). The tacticity of PP blocks was designated based on the literature (Galland, G. B. et al., J. Polym. Sci. Part A: Polym. Chem. 2004, 42, 2171-2178). Since no head-to-head defects of PMA were observed in the nuclear magnetic resonance spectra, the ethylene defects may be attributed to the rearrangement of the methyl group during the reaction.

As illustrated in FIG. 9, established reaction conditions were applied to convert PS-b-PMA and PMA to PS-b-PP and PP (see FIG. 8B for the synthesis of PS-b-PMA). The successful formation of SP(42-7) and P(4) from SM(42-18) and M(10) was verified through $^1$H NMR and SEC analysis, supporting the deoxygenation method. The SEC tracking of PS-b-PP shows a clean shift to a higher elution volume without broadening, indicating that the narrow molar mass distribution achieved by the RAFT polymerization was maintained during the oxygenation reaction, as in the case of PS-b-PP-b-PS. However, considerable widening of the SEC trace of PP homopolymer was observed. It is not clear what causes the broadening of the molar mass distribution here. Characterization details of the synthesized polymers are summarized in Table 2 below.

TABLE 2

| | Precursors | | | | Polyolefins | | |
|---|---|---|---|---|---|---|---|
| Entry | $M_{nNMR}{}^a$ | $M_{n,SEC}{}^a$ | $Đ^a$ | Entry | $M_{nNMR}{}^a$ | $M_{n,SEC}{}^a$ | $Đ^a$ |
| SMS | 8-10-4 | 24 | 1.12 | SPS | 8-4-4 | 11 | 1.24 |
| SM | 42-18 | 49 | 1.21 | SP | 42-7 | 32 | 1.26 |
| M | 10 | 11 | 1.24 | P | 4 | 4 | 1.81 |

$^a$in kg mol$^{-1}$

Figure 3A:
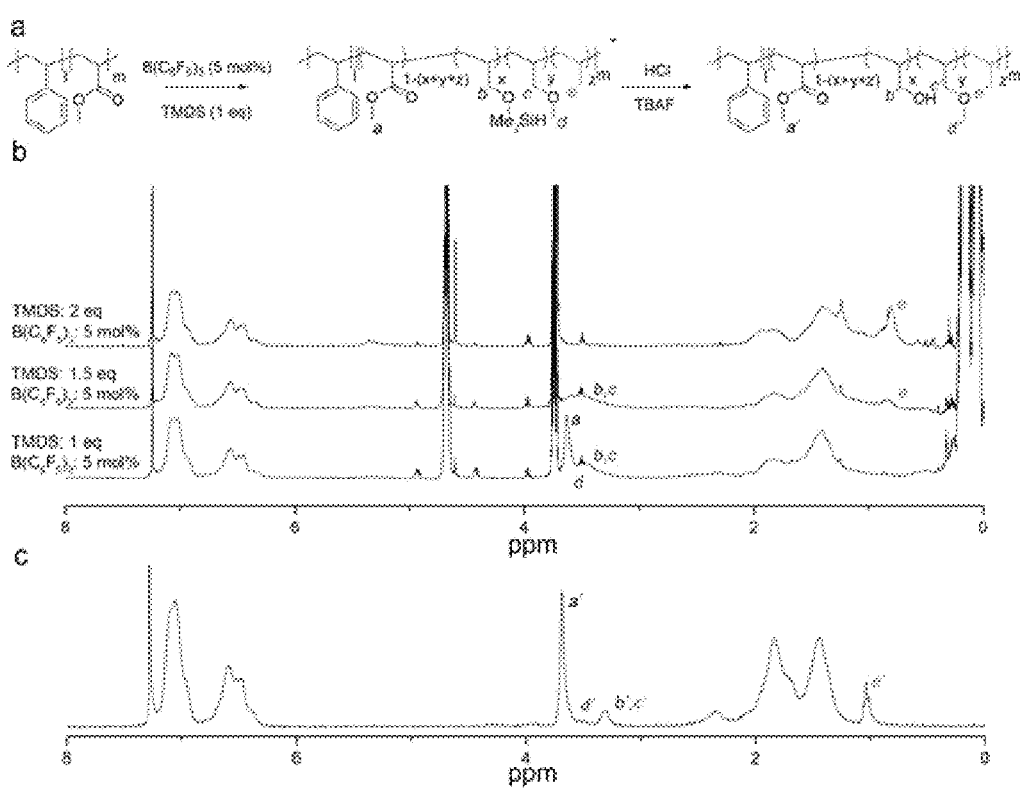
FIG. 3A illustrates (a) partial deoxygenation of PS-b-PMA to produce PS-b-PP-containing functional groups along the PP block according to an embodiment of the present invention, (b)$^1$H NMR spectra of SM(42-18) after treatment with 1, 1.5, and 2 equivalents of TMDS, and (c) a $^1$H NMR spectrum of isolated SP$_{0.47}$(42-13)
Figure 3B:
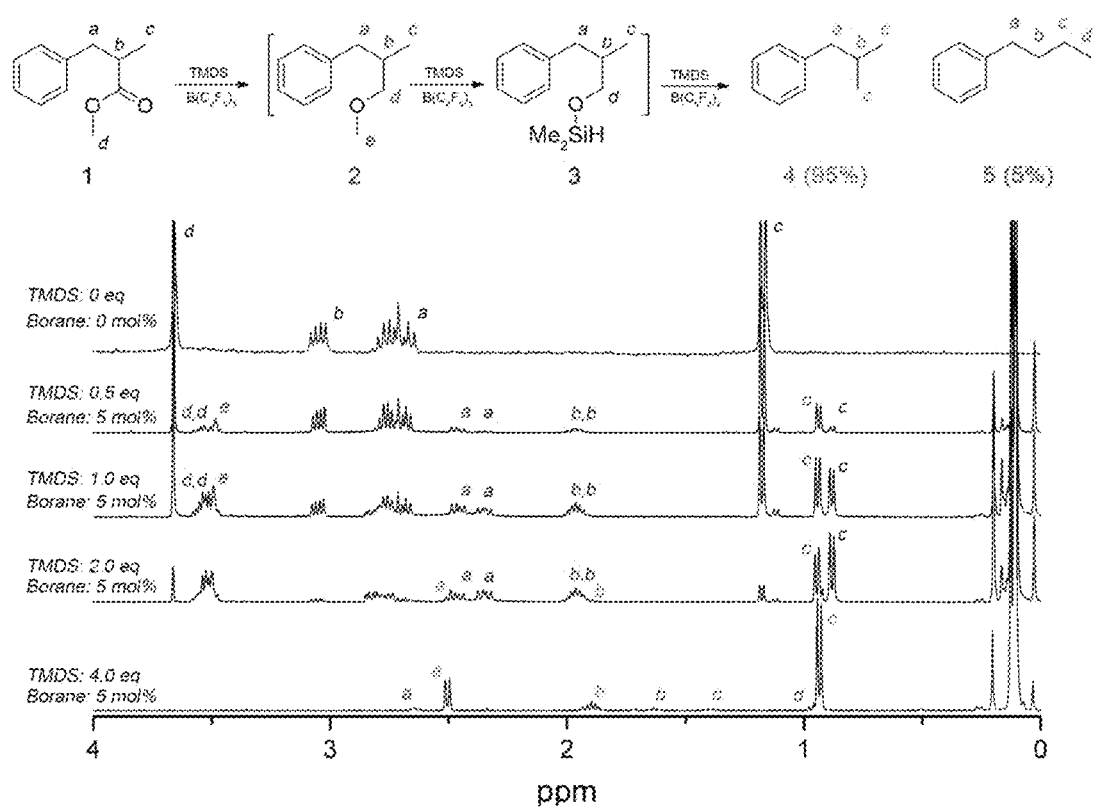
FIG. 3B illustrates in-situ $^1$H NMR spectra of B(C$_6$F$_5$)$_3$-catalyzed deoxygenation of different amounts of TMDS and methyl-2-methyl-3-phenylpropanoate (1) according to an embodiment of the present invention, wherein the spectra were obtained in CDCl$_3$ at RT after 24 hours.

In addition, the possibility of partially deoxygenating PMA by adjusting the ratio of B(C$_6$F$_5$)$_3$ and TMDS relative to the PMA repeating unit to provide the functional PP with pendent functional groups was confirmed (see FIG. 3A). It was confirmed that, while the use of 5 equivalents of TMDS was sufficient to quantitatively eliminate all oxygen in SM(42-18), about 60% of methyl ester protons in the PMA repeating units disappeared after treatment with 1 equivalent of TMDS, and accordingly, 47% of propylene, 4% of allyl alcohol, and 9% of methyl ether were newly formed. It was confirmed through nuclear magnetic resonance spectra that peaks corresponding to hydrogen of alpha carbon of allyl alcohol and hydrogen of methoxy carbon of methyl ether newly appeared at 3.3 ppm and 3.5 ppm, respectively.

Figure 15:
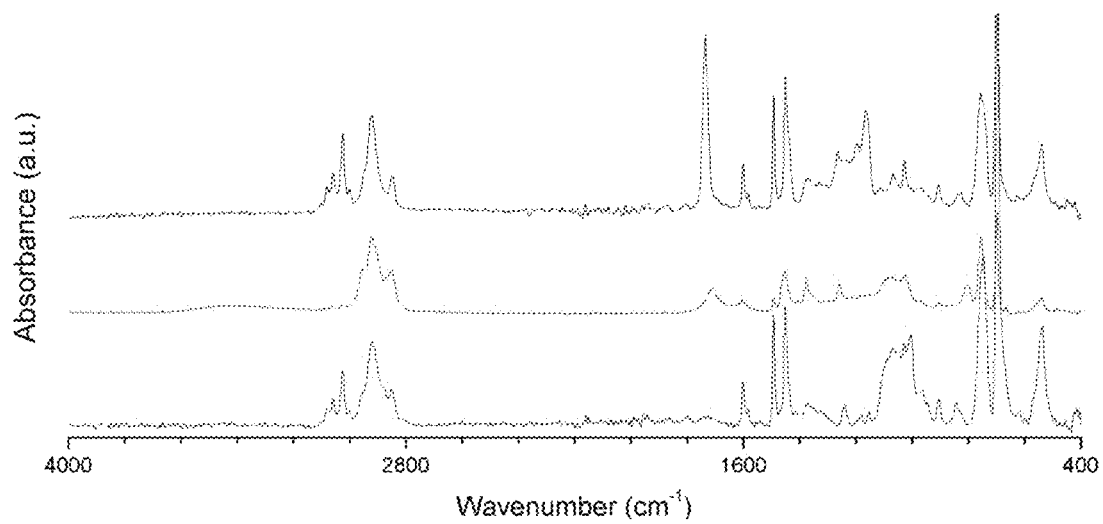
FIG. 15 illustrates an FT-IR spectrum (red) of SP$_{0.47}$(42-13) according to an embodiment of the present invention, wherein the spectra of SM(42-18) (black) and SP(42-7) (blue) are also shown as references.

Based on observation from the model reaction, a new peak was assigned to a methylene proton adjacent to a hydroxyl group. Heteronuclear single quantum coherence spectroscopy (HSQC) and $^1$H-$^1$H correlation spectroscopy (COSY) analysis support these results (see FIGS. 11 and 12). By integrating the $^1$H NMR spectrum, the molar fractions of propylene, allyl alcohol, and methyl acrylate repeating units were estimated at 47%, 13%, and 40%, respectively (see FIG. 3C). The appearance of O—H vibrational bands at 3500 cm$^{-1}$ in the FTIR spectrum confirmed the presence of hydroxyl groups (see FIG. 15). The SEC analysis indicated a smaller reduction in the molar mass than in fully deoxygenated products, consistent with partial deoxygenation (see FIG. 13). These results suggest that the synthesis of functional PP with a control of functional group density can be achieved through deoxygenation by taking advantage of PMA as a precursor having 100% functionality. By further adjusting the TMDS/PMA ratio, PS-b-PPs with different functional group densities were produced (see FIG. 3B).

Figure 17:
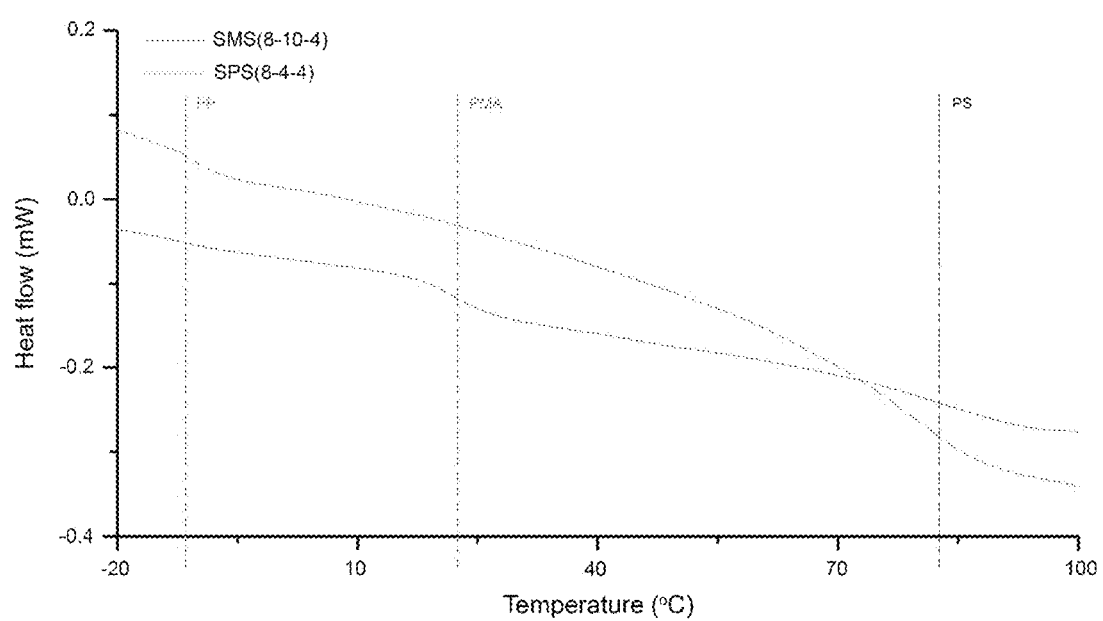
FIG. 17 illustrates DSC thermograms of SMS(8-10-4) and SPS(8-4-4) according to an embodiment of the present invention.

The chemical transformation of PMA into PP has a significant effect on the thermal and mechanical properties of the triblock copolymer. The differential scanning calorimetry (DSC) data of SPS(8-4-4) shows two distinct glass transitions at 110° C. and −8° C., corresponding to PS and atactic PP, respectively, suggesting that microphase separation occurs to form PS and PP microdomains (see FIG. 17). The glass transition of PMA at 20° C. observed in SMS(8-10-4) is not distinguishable in the thermogram of SPS(8-4-4). A significant reduction in glass transition temperature ($T_g$) indicates that SPS behaves as a thermoplastic elastomer containing a rubbery PP middle block with low $T_g$ between glassy PS end blocks.

Figure 16:
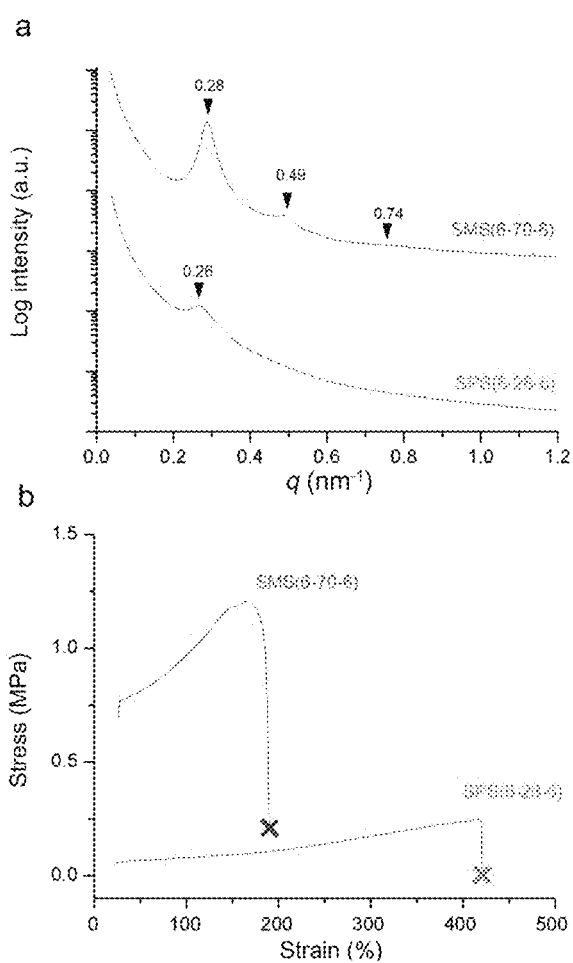
FIG. 16 illustrates the microphase separation behavior and mechanical properties of PS-b-PP-b-PS compared with PS-b-PMA-b-PS according to an embodiment of the present invention, wherein (a) is SAXS data of SMS(6-70-6) and SPS(6-28-6), and (b) is representative strain-stress curves of SMS(6-70-6) and SPS(6-28-6)

To confirm the microphase separation behavior and the mechanical properties of SPS, SMS(6-70-6) containing a PMA intermediate block having a higher molar mass was synthesized, and then converted into SPS(6-28-6) corresponding thereto (see FIG. 10). Although complete deoxygenation was confirmed even with this material with high molar mass, SPS(6-28-6) showed a broader SEC trace distribution probably due to chain scrambling accompanied by a rearrangement reaction. Nevertheless, SPS(6-28-6) showed a distinct scattering peak at scattering vector (q*) =0.26 nm$^{-1}$ in the small-angle X-ray scattering (SAXS) measurement, indicating that the block polymer structure was maintained to induce microphase separation (see FIG. 16A). Compared with the SAXS pattern of SMS(6-70-6) showing scattering peaks originating from the hexagonal symmetry, the scattering intensity of SPS(6-28-6) is reduced, probably due to a decrease in electron density contrast as a result of deoxygenation. Consistent with the chemical transformation of PMA into PP, SPS(6-28-6) showed a much higher ultimate elongation of 425% at break and a lower Young's modulus (0.26 MPa) compared with those of SMS(6-70-6) (see FIG. 16B).

Example 2: Deoxygenation Reaction Using Polyacrylate and Various Silanes

Examples of the deoxygenation reaction of polyacrylate precursors other than poly(methyl acrylate) are as follows:

[Poly(ethyl acrylate)]

In a 20 mL test tube, 10 mL of ethyl acrylate monomer, 0.06 g of azobisisobutyronitrile, 0.045 g of a-methylstyrene dimer, and 1 mL of toluene were added and polymerized at 80° C. for 15 hours. After adding 5 mL of acetone to the test tube in which the polymerization was completed, the reactant was diluted, and the polymer was precipitated in 500 mL of methanol and filtered in a Buchner funnel, and the thus obtained polymer was dried in a vacuum oven at room temperature for 24 hours. After drying, $^1$H NMR was measured, and position signals A and B of hydrogen capable of determining the reactivity of ester oxygen and carbonyl oxygen were indicated in each figure.

[Poly(n-butyl acrylate)]

Poly(n-butyl acrylate) was prepared by performing in the same manner as the polymerization method of poly(ethyl acrylate), except that 10 mL of n-butyl acrylate monomer, 0.046 g of azobisisobutyronitrile and 0.033 mL of a-methylstyrene dimer were used.

[Poly(2-ethylhexyl acrylate)]

Poly(2-ethylhexyl acrylate) was prepared by performing in the same manner as the polymerization method of poly(ethyl acrylate), except that 10 mL of 2-ethylhexyl acrylate monomer, 0.032 g of azobisisobutyronitrile and 0.023 mL of a-methylstyrene dimer were used.

[Poly(t-butyl acrylate)]

Poly(2-ethylhexyl acrylate) was prepared by performing in the same manner as the polymerization method of poly(ethyl acrylate), except that 10 mL of t-butyl acrylate monomer, 0.045 g of azobisisobutyronitrile and 0.033 mL of a-methylstyrene dimer were used.

[Poly(phenyl acrylate)]

Poly(phenyl acrylate) was prepared by performing in the same manner as the polymerization method of poly(ethyl acrylate), except that 10 mL of phenyl acrylate monomer, 0.012 g of azobisisobutyronitrile and 0.025 mL of a-methylstyrene dimer were used.

Examples of the deoxygenation reaction performed using the prepared precursor is as follows:

Example 2a

In a 4 ml vial, 0.01 g of poly(ethyl acrylate), 0.0026 g of $B(C_6F_5)_3$, 2 mL of deuterated chloroform were added, and 0.065 mL of n-butylsilane was added with stirring by a magnetic bar. After stirring at room temperature for 24 hours, $^1$H NMR was measured in situ to confirm whether ester oxygen and carbonyl oxygen were removed. In the $^1$H NMR spectrum, the ester oxygen was determined as to whether or not hydrogen of ester carbon (signal A) was removed, and the carbonyl oxygen was determined as whether the hydrogen at the alpha position (signal B) was moved. The results are shown in Table 3 and each figure.

Example 2b

This Example was performed in the same manner as the Example 2a, except that 0.065 mL of diethylsilane was used instead of n-butylsilane.

Example 2c

This Example was performed in the same manner as the Example 2a, except that 0.093 mL of diphenylsilane was used instead of n-butylsilane.

Example 2d

This Example was performed in the same manner as the Example 2a, except that 0.088 mL of 1,1,3,3-tetramethyldisiloxane was used instead of n-butylsilane.

Example 2e

This Example was performed in the same manner as the Example 2a, except that 0.01 g of poly(n-butyl acrylate), 0.002 g of $B(C_6F_5)_3$ and 0.051 mL of normal butylsilane were used, respectively, instead of 0.01 g of poly(ethyl acrylate), 0.0026 g of $B(C_6F_5)_3$ and 0.065 mL of n-butylsilane.

Example 2f

This Example was performed in the same manner as the Example 2e, except that 0.051 mL of diethylsilane was used instead of n-butylsilane.

Example 2g

This Example was performed in the same manner as the Example 2e, except that 0.072 mL of diphenylsilane was used instead of n-butylsilane.

Example 2h

This Example was performed in the same manner as the Example 2e, except that 0.069 mL of 1,1,3,3-tetramethyldisiloxane was used instead of n-butylsilane.

Example 2i

This Example was performed in the same manner as the Example 2a, except that 0.01 g of poly(2-ethylhexyl acrylate), 0.0014 g of B(C$_6$F$_5$)$_3$ and d0.054 mL of triethylsilane were used, respectively, instead of 0.01 g of poly(ethyl acrylate), 0.0026 g of B(C$_6$F$_5$)$_3$ and 0.065 mL of n-butylsilane.

Example 2j

This Example was performed in the same manner as the Example 2i, except that 0.035 mL of n-butylsilane was used instead of triethylsilane.

Example 2k

This Example was performed in the same manner as the Example 2i, except that 0.035 mL of diethylsilane was used instead of triethylsilane.

Example 2l

This Example was performed in the same manner as the Example 2i, except that 0.036 mL of dimethylethylsilane was used instead of triethylsilane.

Example 2m

This Example was performed in the same manner as the Example 2i, except that 0.050 mL of diphenylsilane was used instead of triethylsilane.

Example 2n

This Example was performed in the same manner as the Example 2i, except that 0.048 mL of 1,1,3,3-tetramethyldisiloxane was used instead of triethylsilane.

Example 2o

This Example was performed in the same manner as the Example 2a, except that 0.01 g of poly(t-butyl acrylate), 0.002 g of B(C$_6$F$_5$)$_3$ and 0.051 mL of n-butylsilane were used, respectively, instead of 0.01 g of poly(ethyl acrylate), 0.0026 g of B(C$_6$F$_5$)$_3$, and 0.01 g of poly(t-butyl acrylate).

Example 2p

This Example was performed in the same manner as the Example 2o, except that 0.051 mL of diethylsilane was used instead of n-butylsilane.

Example 2q

This Example was performed in the same manner as the Example 2o, except that 0.072 mL of diphenylsilane was used instead of n-butylsilane.

Example 2r

This Example was performed in the same manner as the Example 2o, except that 0.069 mL of 1,1,3,3-tetramethyldisiloxane was used instead of n-butylsilane.

Example 2s

This Example was performed in the same manner as the Example 2a, except that 0.01 g of poly(phenyl acrylate), 0.0017 g of B(C$_6$F$_5$)$_3$ and 0.044 mL of diethylsilane were used, respectively, instead of 0.01 g of poly(ethyl acrylate), 0.0026 g of B(C$_6$F$_5$)$_3$ and 0.065 mL of n-butylsilane.

Example 2t

This Example was performed in the same manner as the Example 2s, except that 0.045 mL of dimethylethylsilane was used instead of diethylsilane.

Example 2u

This Example was performed in the same manner as the Example 2s, except that 0.063 mL of diphenylsilane was used instead of diethylsilane.

Example 2v

This Example was performed in the same manner as the Example 2s, except that 0.060 mL of 1,1,3,3-tetramethyldisiloxane was used instead of diethylsilane.

As shown in Table 3 and FIG. 18 to FIG. 22, examples in which deoxygenation reactions proceed using combinations of various polyacrylate precursors and silanes can be confirmed.

TABLE 3

Figure 18:
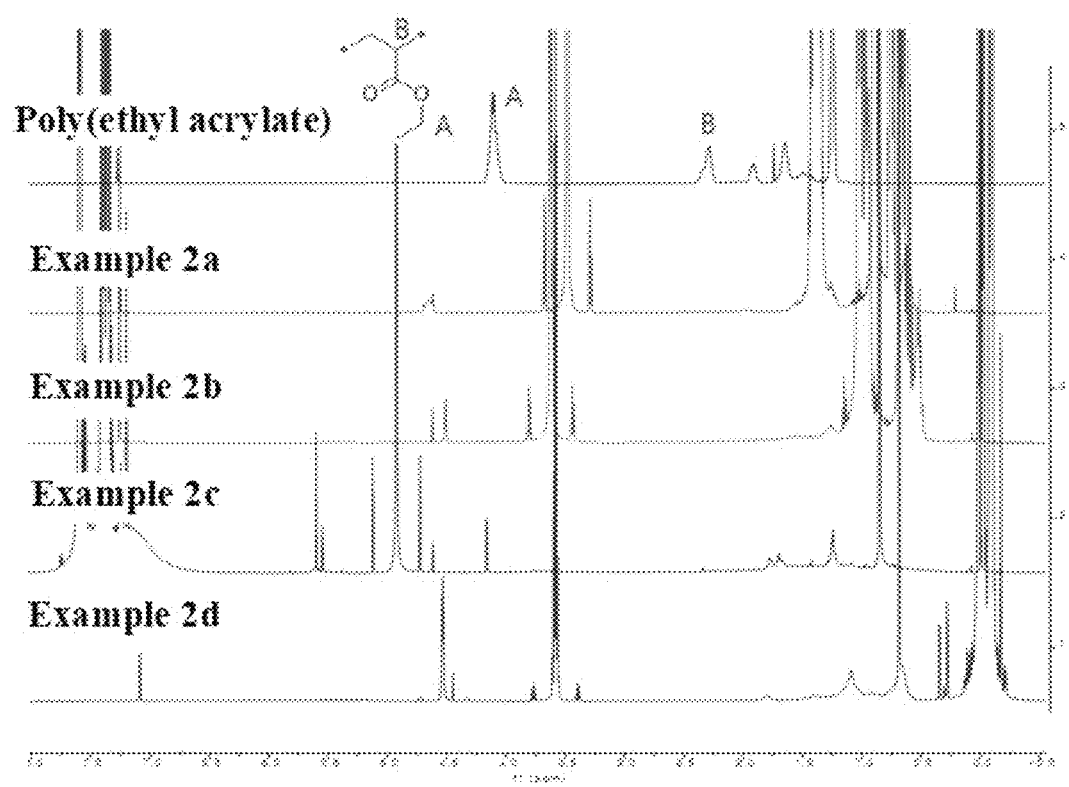
FIG. 18 shows the deoxygenation reaction in situ $^1$H NMR results of applying poly(ethyl acrylate) and various silanes in Examples 2a, 2b, 2c and 2d.
Figure 19:
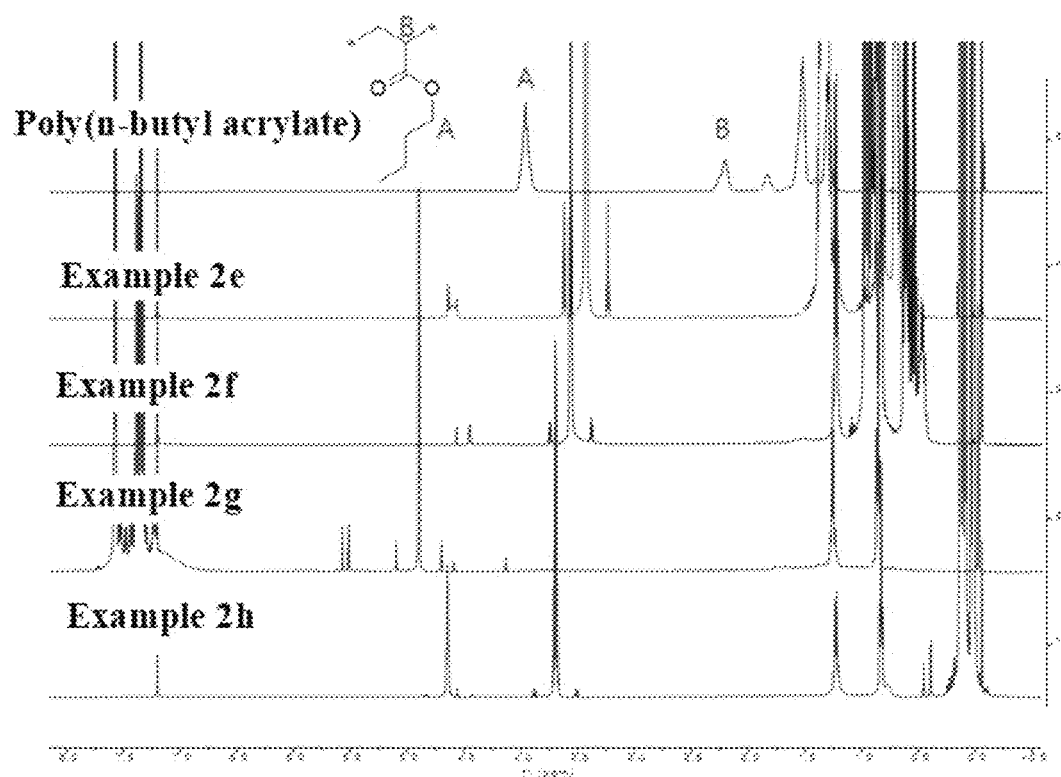
FIG. 19 shows the deoxygenation reaction in situ $^1$H NMR results of applying poly(n-butyl acrylate) and various silanes in Examples 2e, 2f, 2g and 2h.
Figure 20:
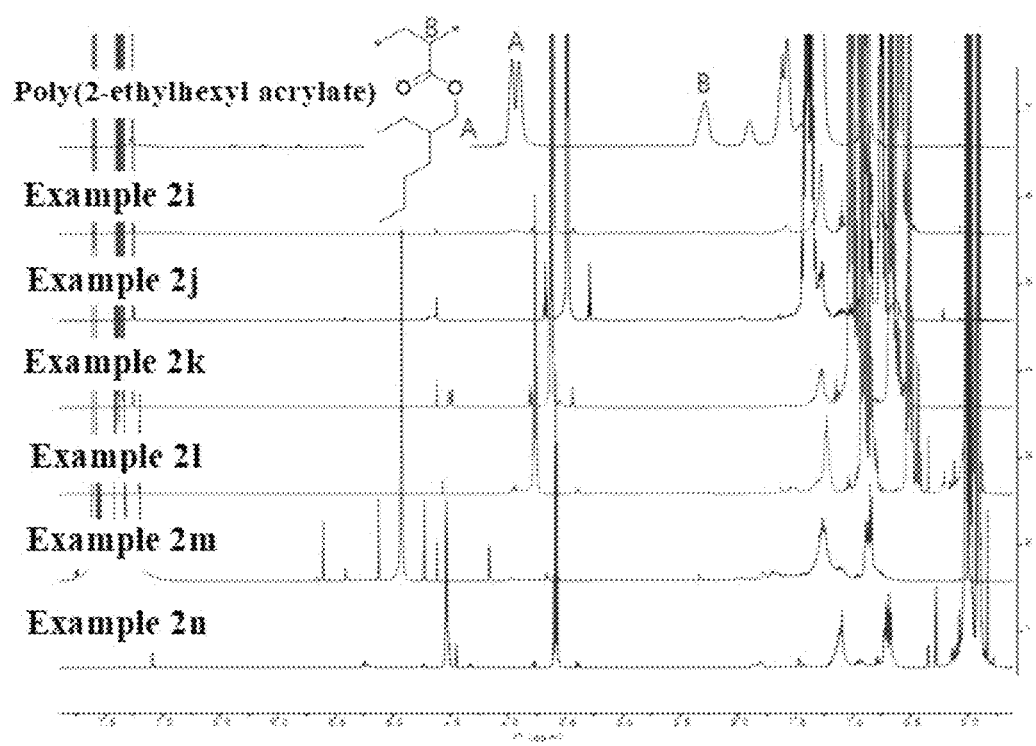
FIG. 20 shows the deoxygenation reaction in situ $^1$H NMR results of applying poly(2-ethylhexyl acrylate) and various silane in Examples 2i, 2j, 2k, 2l, 2m and 2n.
Figure 21:
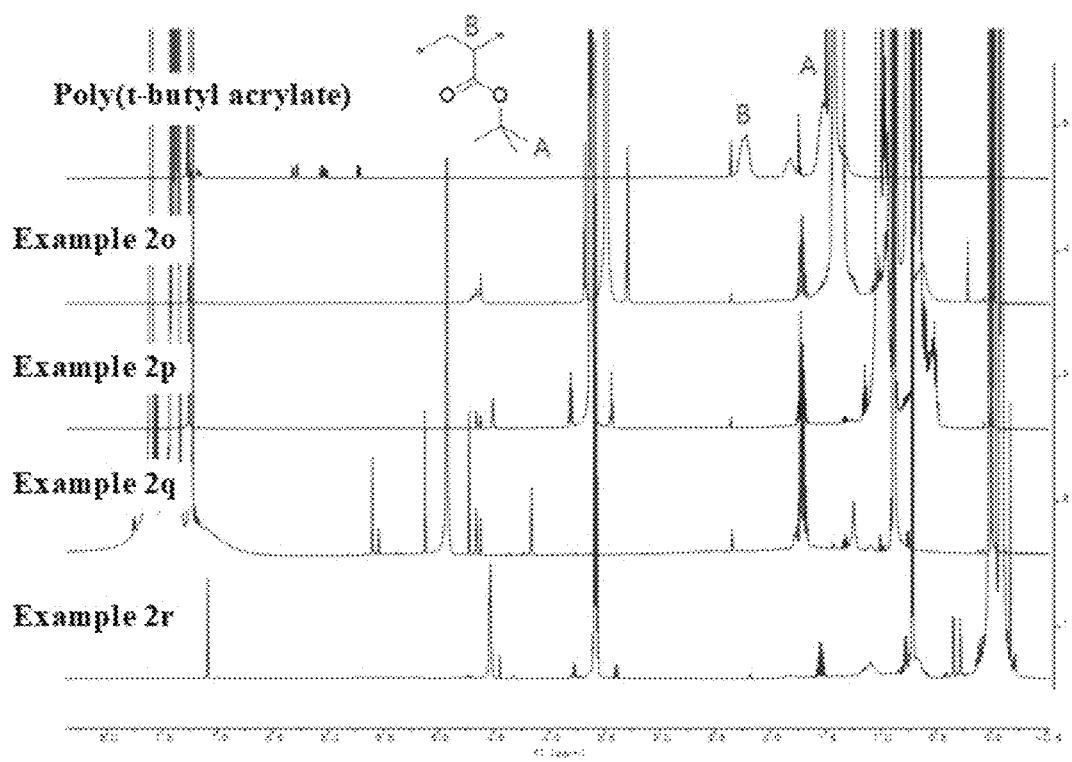
FIG. 21 shows the deoxygenation reaction in situ $^1$H NMR results of applying poly(2-ethylhexyl acrylate) and various silanes in Examples 2o, 2p, 2q and 2r.

| Example No. | Precursor | Silane | Ester oxygen removal (Signal A) | Carbonyl oxygen removal (Signal B) | FIG. No. |
|---|---|---|---|---|---|
| 2a | Poly(ethyl acrylate) | n-butylsilane | o | o | FIG. 18 |
| 2b | Poly(ethyl acrylate) | diethylsilane | o | o | FIG. 18 |
| 2c | Poly(ethyl acrylate) | Diphenylsilane | o | o | FIG. 18 |
| 2d | Poly(ethyl acrylate) | 1,1,3,3-tetramethyldisiloxane | o | o | FIG. 18 |
| 2e | Poly(n-butyl acrylate) | n-butylsilane | o | o | FIG. 19 |
| 2f | Poly(n-butyl acrylate) | Diethylsilane | o | o | FIG. 19 |
| 2g | Poly(n-butyl acrylate) | Diphenylsilane | o | o | FIG. 19 |
| 2h | Poly(n-butyl acrylate) | 1,1,3,3-tetramethyldisiloxane | o | o | FIG. 19 |
| 2i | Poly(2-ethylhexyl acrylate) | Triethylsilane | o | o | FIG. 20 |
| 2j | Poly(2-ethylhexyl acrylate) | n-butylsilane | o | o | FIG. 20 |
| 2k | Poly(2-ethylhexyl acrylate) | Diethylsilane | o | o | FIG. 20 |
| 2l | Poly(2-ethylhexyl acrylate) | Dimethylethylsilane | o | o | FIG. 20 |
| 2m | Poly(2-ethylhexyl acrylate) | Diphenylsilane | o | o | FIG. 20 |
| 2n | Poly(2-ethylhexyl acrylate) | 1,1,3,3-tetramethyldisiloxane | o | o | FIG. 20 |
| 2o | Poly(t-butyl acrylate) | n-butylsilane | o | o | FIG. 21 |
| 2p | Poly(t-butyl acrylate) | Diethylsilane | o | o | FIG. 21 |

TABLE 3-continued

Figure 22:
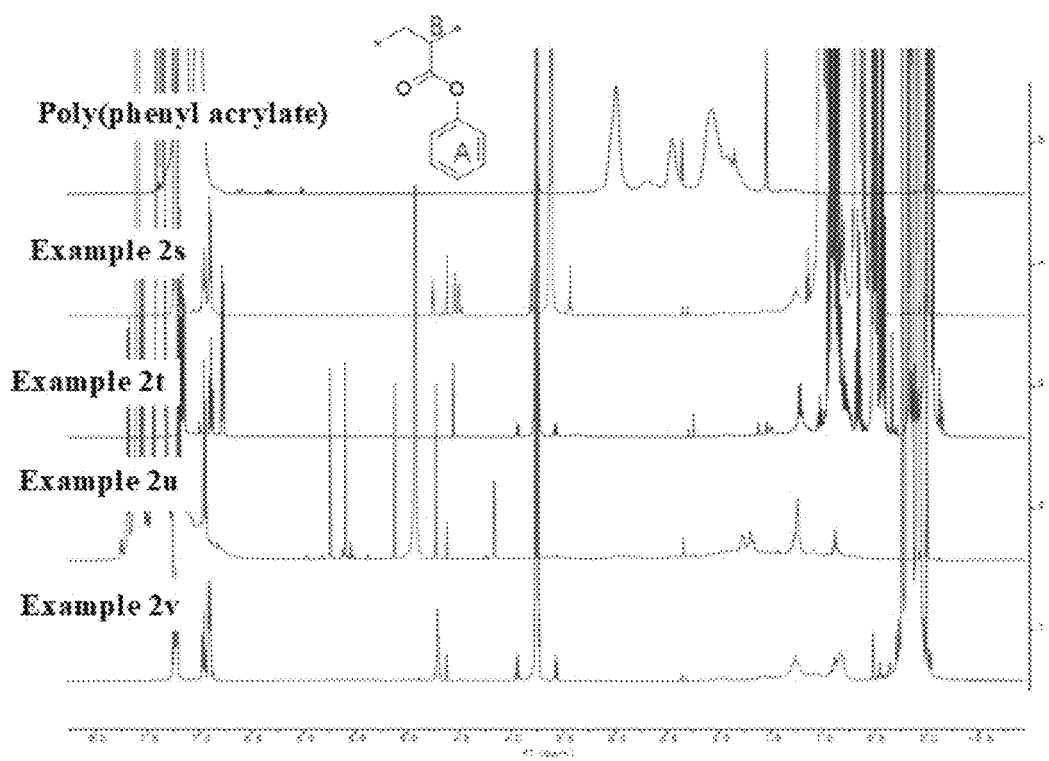
FIG. 22 shows the deoxygenation reaction in situ $^1$H NMR results of applying poly(phenyl acrylate) and various silanes in Examples 2s, 2t, 2u and 2v.

| Example No. | Precursor | Silane | Ester oxygen removal (Signal A) | Carbonyl oxygen removal (Signal B) | FIG. No. |
|---|---|---|---|---|---|
| 2q | Poly(t-butyl acrylate) | Diphenylsilane | o | o | FIG. 21 |
| 2r | Poly(t-butyl acrylate) | 1,1,3,3-tetramethyldisiloxane | o | o | FIG. 21 |
| 2s | Poly(phenyl acrylate) | Diethylsilane | o | o | FIG. 22 |
| 2t | Poly(phenyl acrylate) | Dimethyletheylsilane | o | o | FIG. 22 |
| 2u | Poly(phenyl acrylate) | Diphenylsilane | o | o | FIG. 22 |
| 2v | Poly(phenyl acrylate) | 1,1,3,3-tetramethyldisiloxane | o | o | FIG. 22 |

Example 3: Synthesis of Novel Poly(Methyl Methylene) Polymer Through Deoxygenation Reaction of Poly(Isopropyl Fumarate)

Synthesis of Poly(Isopropyl Fumarate)-b-Polystyrene Polymer Precursor (FS(20-11))

Figure 23:
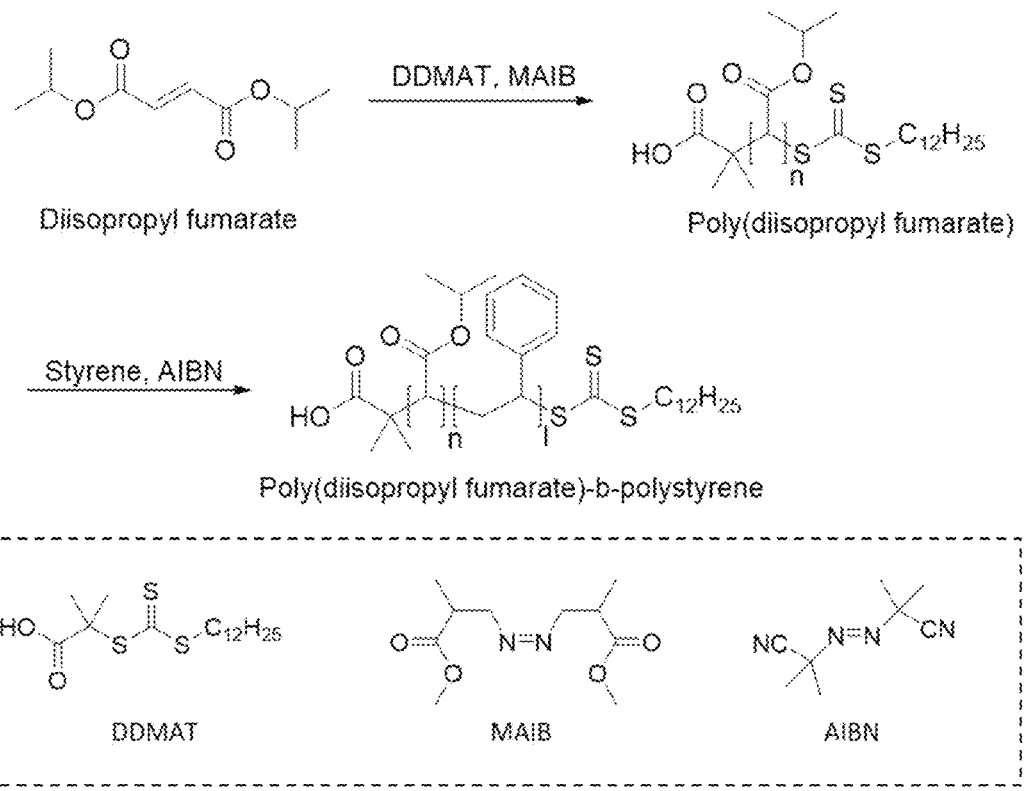
FIG. 23 is a reaction scheme illustrating the synthesis route to poly(isopropyl fumarate)-b-polystyrene according to an embodiment of the present invention.

Poly(isopropyl fumarate)-b-polystyrene was synthesized through the synthetic route illustrated in FIG. 23. First, poly(isopropyl fumarate) was synthesized, and then polymerized with styrene to synthesize a diblock copolymer.

First, poly(isopropyl fumarate) was polymerized using the following method. 1 g of diisopropyl fumarate, 0.017 g of a chain transfer agent (CTA), and 0.004 g of dimethyl-2,2'-azobisisobutyrate (MAIB) were added to a 50 mL shrink flask to prepare a uniform polymerization solution. After three freeze-pump-thaw cycles, the mixture was placed in an oil bath at 80° C. and polymerization was allowed to occur for 8 hours. Thereafter, the flask was cooled to room temperature, followed by precipitation in methanol, thereby obtaining a polymer. Finally, after drying in a vacuum, the polymer was recovered. It was confirmed through size exclusion chromatography that the molecular weight of the polymer was 22 kg mol$^{-1}$.

Poly(isopropyl fumarate)-b-polystyrene was obtained by polymerizing poly(isopropyl fumarate)-macro chain transfer agent with styrene. The experiment was conducted in the same manner as the aforementioned experimental processes. 1 g of poly(isopropyl fumarate)-macro chain transfer agent, 1.9 g of styrene, 2 mg of azobisisobutyronitrile, and 4 mL of toluene were placed in a 50 mL shrink flask to prepare a homogeneous polymerization solution, followed by three freeze-pump-thaw cycles. After a polymerization reaction at 70° C. for 24 hours, a polymer was obtained through precipitation in methanol and finally dried in a vacuum oven overnight to recover poly(isopropyl fumarate)-b-polystyrene. It was confirmed through nuclear magnetic resonance analysis that the total molecular weight of the synthesized polymer was 27 kg Deoxygenation of Poly(Isopropyl Fumarate)-b-Polystyrene (FS(20-11))

This example was performed in the same manner as the deoxygenation reaction of the polymer precursor containing poly(methyl acrylate). In a 50 mL one-neck round flask, 0.1 g of FS (20-11) (number of units of poly(isobutyl fumarate): 0.90 mmol), 0.023 g of tris(pentafluorophenyl)borane (0.045 mmol, 5 mol % of the poly(isopropyl fumarate) unit number) was dissolved in 5 mL of toluene to make a uniform mixture. Thereafter, 1.21 g of 1,1,3,3-tetramethyldisiloxane (9.0 mmol, 5 equivalents of the number of units of poly(isopropyl fumarate)) was slowly added to the reaction solution and stirred at room temperature for one day. The reaction was terminated by adding 2 mL of a 1.25M-hydrochloric acid/methanol solution to the reaction solution. Then, 3 mL of a tetrabutyl ammonium fluoride solution dissolved in 1.25 M in tetrahydrofuran was added to the terminated reaction solution and stirred at room temperature for 12 hours. Then, after precipitating in methanol, the precipitate was filtered and recovered. Finally, the polymer was obtained by drying in vacuum for one day.

Figure 24:
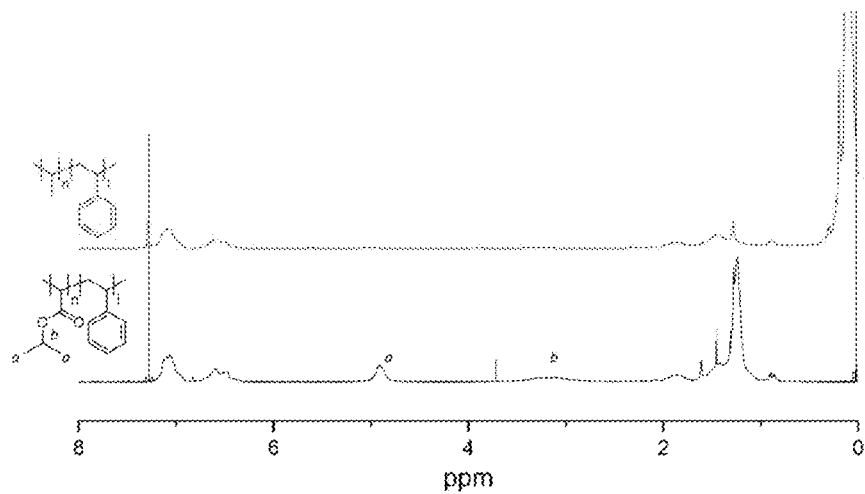
FIG. 24 is a $^1$H nuclear magnetic resonance spectrum of a polymer analyzed after the deoxygenation reaction of a diblock copolymer of poly(isopropyl fumarate)-b-polystyrene according to an embodiment of the present invention.
Figure 25:
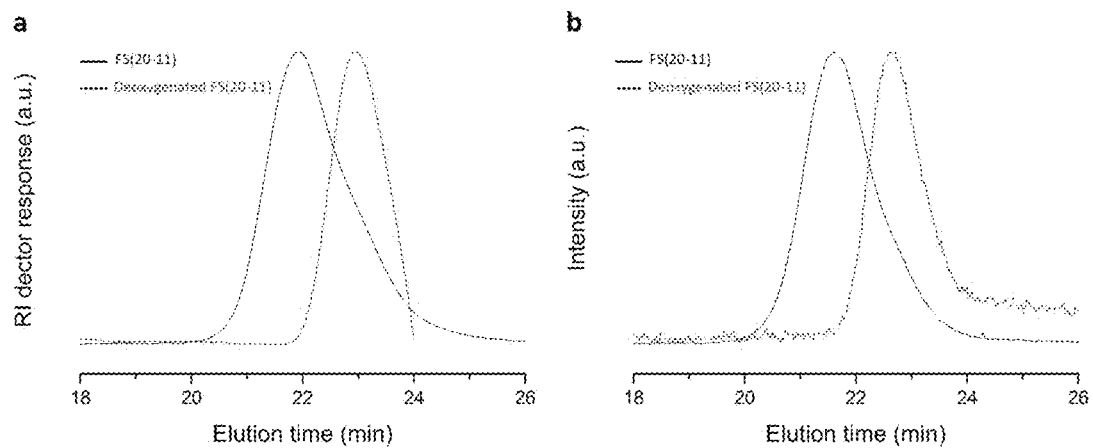
FIG. 25 illustrates (a) data of the chromatogram of a polymer analyzed after the deoxygenation reaction of a diblock copolymer of poly(isopropyl fumarate)-b-polystyrene according to an embodiment of the present invention, wherein the data was analyzed using a refractive index detector, and (b) data analyzed using a light-scattering detector.
Figure 26:
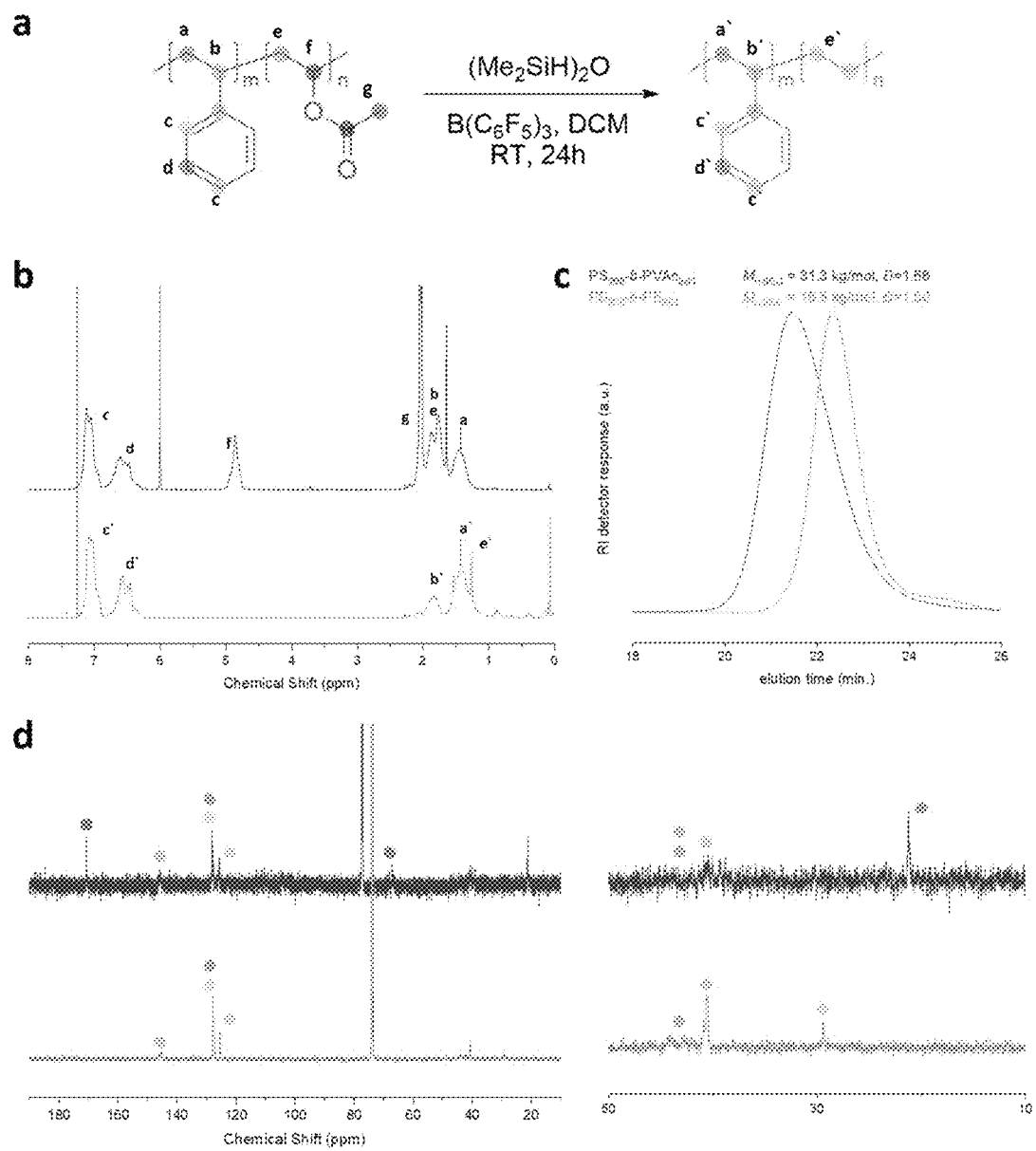
FIG. 26 shows the synthesis pathway of PS-b-PE by deoxygenation of PS-b-PVAc according to an embodiment of the present invention (a), and diagrams showing $^1$H NMR (b), SEC (c) and $^{13}$C NMR (d) data of SE (22-7) (orange), compared to parent SV(22-23) (blue)

The $^1$H nuclear magnetic resonance spectrum and size exclusion chromatograms of di(block) copolymer of poly(isopropyl fumarate)-b-polystyrene and poly(methyl methylene)-b-polystyrene polymer obtained after the deoxygenation reaction were shown in FIG. 24 and FIG. 25.

Example 4: Synthesis of Polyethylene Through Deoxygenation Reaction of Poly(Vinyl Acetate)

It was confirmed whether the deoxygenation reaction can be applied to other polymers by changing the polymerized monomer and through this, polyethylene was synthesized.

Reagents and Equipment

1-Phenyl-2-propyl acetate was synthesized according to the method reported in previous studies (Shirini, F. et al. Int. J. Chem. Sci. 2003, 1, 53-56). Styrene (99%) was purchased from Sigma-Aldrich and purified through an alumina column before polymerization. Vinyl acetate was purchased from Tokyo Chemical Industry Co. and was purified through an alumina column before polymerization. Methyl 2-[methyl(4-pyridinyl)carbamo]thioylthiopropionate was purchased from Sigma-Aldrich and used directly without purification. Azobisisobutyronitrile was purchased from Junsei and purified by recrystallization in methanol and stored at minus 20° C. A 1.25M hydrochloric acid/methanol solution and 1,1,3,3-tetramethyldisiloxane were purchased from Sigma-Aldrich and used immediately without purification. Tris(pentafluorophenyl)borane (98%) was purchased from Tokyo Chemical Industry and used without any purification. Chloroform was purchased from J.T. Baker and it was used after purification using a solvent purification device.

The $^1$H nuclear magnetic resonance spectrum of the synthesized polymer was obtained using Bruker AVANCE 400 MHz.

Figure 27:
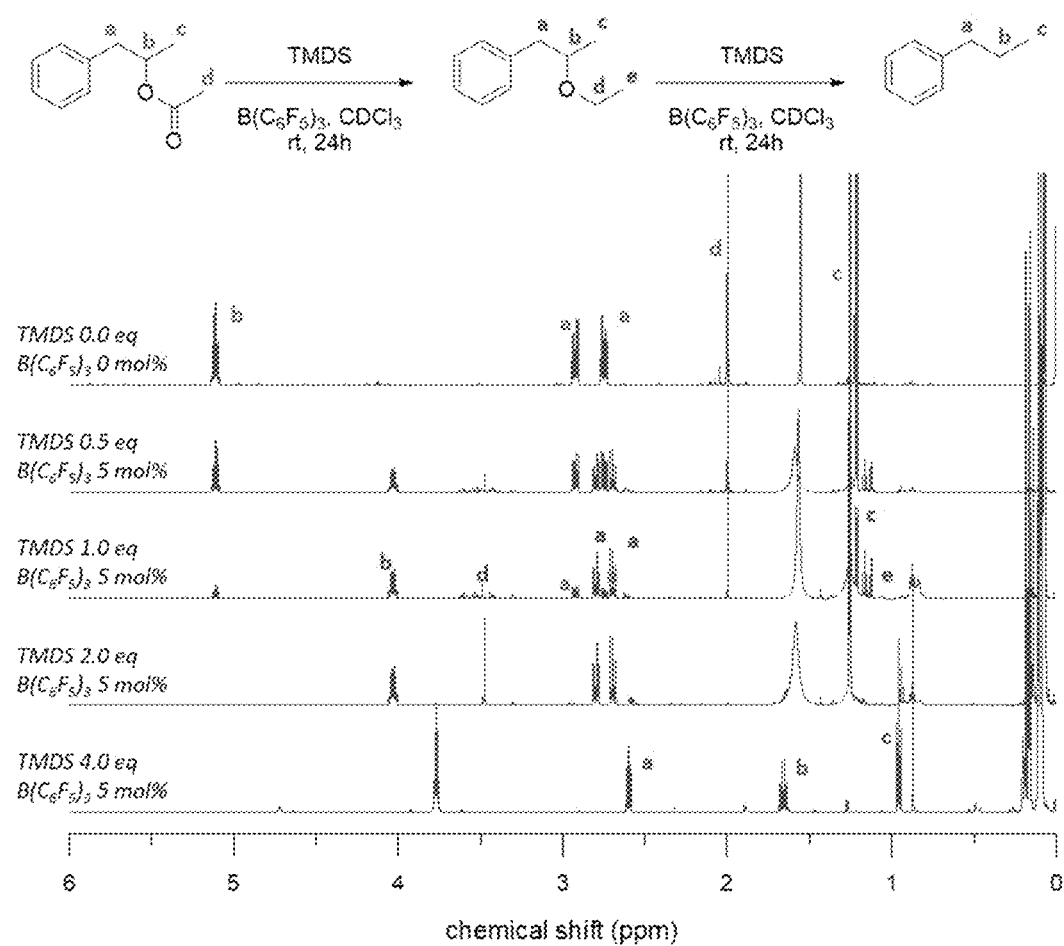
FIG. 27 illustrates an in situ $^1$H NMR spectrum of a $B(C_6F_5)_3$-catalyzed deoxygenation reaction of 1-phenyl-2-propyl acetate (1) with various amounts of TMDS according to an embodiment of the present invention. Spectra were obtained in $CDCl_3$ at RT after 24 hours.

The chromatogram was obtained using an Agilent 1260 infinity model equipped with three PLgel 10 μm MIXED-B columns and a refractive index detector from Optilab UT-rEX. As a solvent, chloroform and tetrahydrofuran at 35° C. and a 0.05M lithium bromide dimethylformamide solution at 40° C. were used, and the molecular weight and the molecular weight and dispersion degree of the polymer were calculated using an EasiCal polystyrene assay sample. The glass transition temperature of the polymer was measured by changing 10° C. per minute from −70° C. to 280° C. using a differential scanning calorimeter TA DSC Q20 model, Deoxygenation Reaction of Model Compounds Based on the results of Example 1, 0.02 g of 1-phenyl-2-propyl acetate was added into a 5 mL vial and 2.88 mg of borane catalyst and 1 mL of deuterated chloroform were added and stirred at room temperature, until a uniform solution was obtained. Silane of 0.5-4 equivalents with respect to a model compound was slowly added to the reaction solution and stirred at room temperature for one day. After the reaction, deoxygenated compounds and reaction intermediates generated through nuclear magnetic resonance experiments were analyzed. The resulting spectrum was shown in FIG. 27.

Synthesis of Polymer Precursors Containing Poly(Vinyl Acetate)

Synthesis of Polystyrene-b-Poly(Vinyl Acetate) (SV(22-23))

Figure 28:
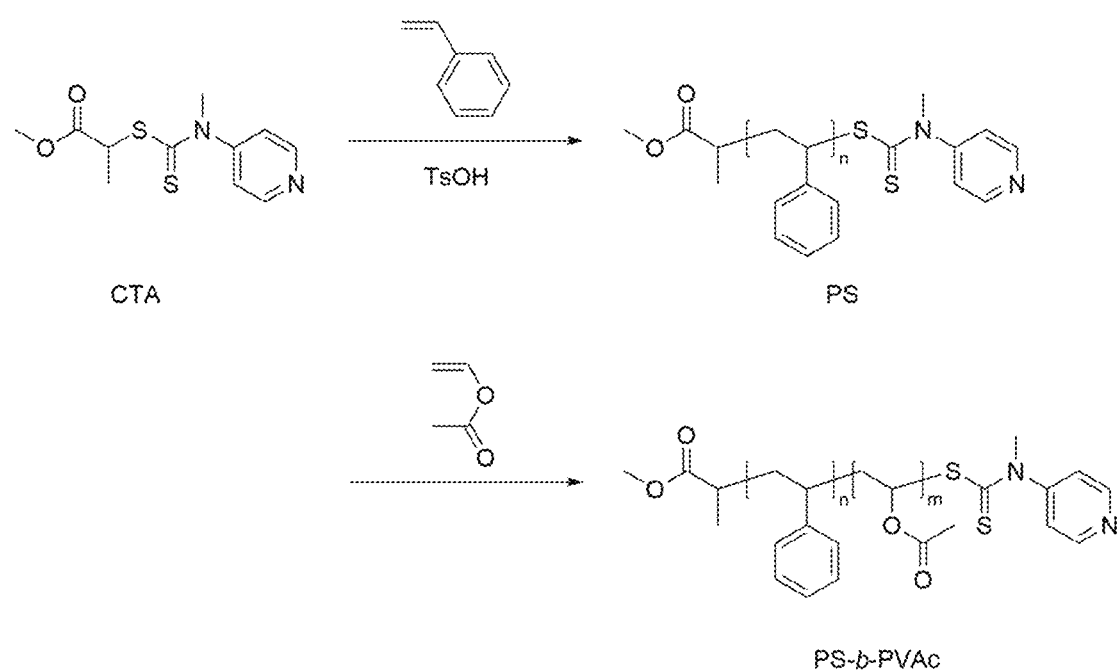
FIG. 28 is a reaction scheme showing the synthetic route of polystyrene-b-poly(vinyl acetate) according to an embodiment of the present invention.

Polystyrene-b-poly(vinyl acetate) was synthesized through the synthetic route shown in FIG. 28. First, polystyrene was synthesized, followed by polymerization of vinyl acetate and synthesis of a double block copolymer.

First, polystyrene was polymerized in the following manner 9.28 g of styrene, 26.5 mg of chain transfer agent (CTA), 2.41 mg of azobisisobutyronitrile, 20.5 mg of tosylic acid, 5 mL of dioxane, 2 mL of acetonitrile were added into a 50 mL Schlenk flask to prepare a uniform polymerization solution. After three freeze-pump-thaw cycles, the mixture was placed in an oil bath at 90° C. to undergo polymerization for 12 hours. Thereafter, the flask was cooled to room temperature, and then 0.0131 g of dimethylaminopyridine was added to neutralize the solution and precipitated in methanol to obtain a polymer. Finally, after drying in vacuum, the polymer was recovered. It was confirmed by size exclusion chromatography that the molecular weight of the polymer was 18 kg mol$^{-1}$.

Figure 29:
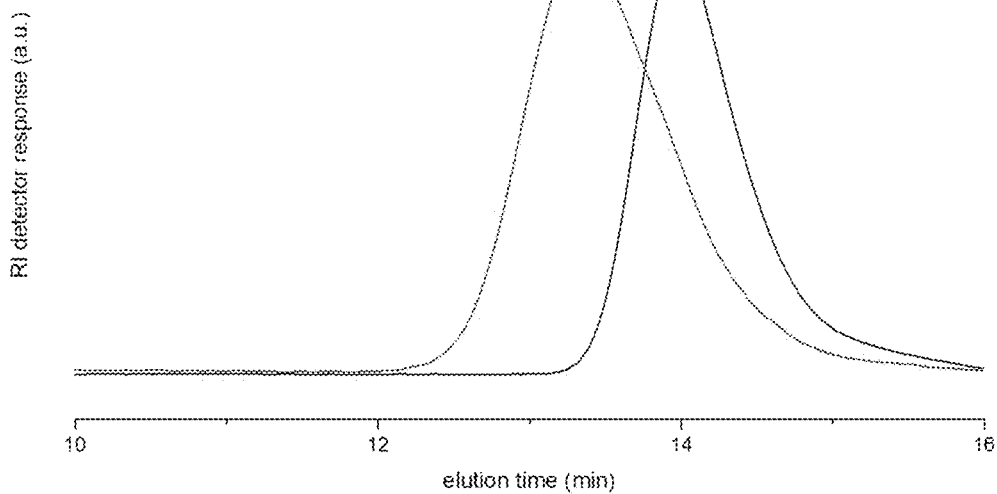
FIG. 29 is a size exclusion chromatogram of a polymer precursor containing poly(vinyl acetate) according to an embodiment of the present invention: (a) SV (22-23). (b) SV (6-3)
Figure 29:
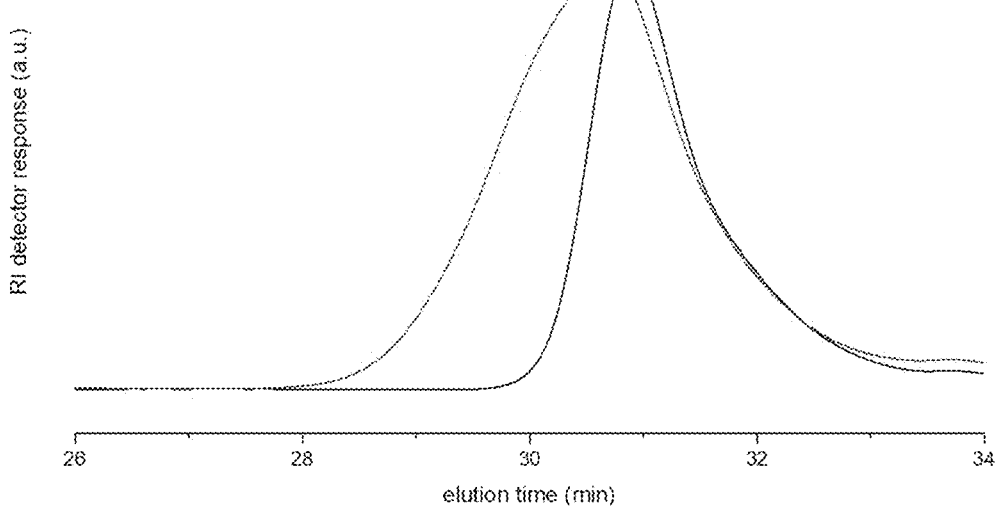

Polystyrene-b-poly(vinyl acetate) was obtained by polymerizing vinyl acetate with a polystyrene-macro chain transfer agent. The experiment procedure mentioned above was performed in the same manner 0.9885 g of polystyrene-macro chain transfer agent, 3.0099 g of vinyl acetate monomer, and 2.21 mg of azobisisobutyronitrile were added into a 50 mL Schlenk flask to prepare a homogeneous polymerization solution, followed by 3 freeze-pump-thaws. After the polymerization reaction at 70° C. for 8 hours, a polymer was obtained through precipitation in water, and finally dried in a vacuum oven for 1 day to recover polystyrene-b-poly(vinyl acetate). It was confirmed through size exclusion chromatography that the molecular weight of the synthesized polymer was 35 kg mol$^{-1}$. The size exclusion chromatogram of the synthesized diblock copolymer was shown in FIG. 29A.

Synthesis of Polystyrene-b-Poly(Vinyl Acetate) (SV(6-3))

This example was performed in the same manner as the process described above except for different ratios of the monomers and chain transfer agents used. Polystyrene of 4 kg mol$^{-1}$ was synthesized through polymerization reaction of 9.09 g of styrene monomer, 0.1887 g of chain transfer agent, 256 mg of azobiscyclohexanecarbonitrile, 0.1153 g of tosylic acid, 8 mL of dioxane, 2 mL of acetonitrile at 90° C. for 12 hours. In addition, 0.6311 g of polystyrene synthesized in situ was used as a macropolymer chain transfer agent, and 6.8872 g of vinyl acetate monomer and 4.93 mg of azobisisobutyronitrile were reacted at 70° C. for 4 hours to synthesize polystyrene-b-poly(vinyl acetate) having molecular weights of 6, 3 kg mol$^{-1}$. The size exclusion chromatogram of the synthesized diblock copolymer was shown in FIG. 29B.

Deoxygenation Reaction of Polymer Precursor Containing Poly(Vinyl Acetate)

The process of the deoxygenation reaction will be described as an example the polymer precursor of SV(18-17). In a 50 mL one-neck round flask, 0.1 g of SV (18-17) (number of units of poly(vinyl acetate): 0.58 mmol), 0.015 g of tris(pentafluorophenyl)borane (0.029 mmol, 5 mol % of number of units of poly(vinyl acetate)) was dissolved in 5 mL of dichloromethane to prepare a uniform mixture. Thereafter, 0.71 g of 1,1,3,3-tetramethyldisiloxane (2.9 mmol, 5 equivalents of the number of units of poly(vinyl acetate)) was slowly added to the reaction solution and stirred at room temperature for one day. The reaction was terminated by adding 2 mL of a 1.25M-hydrochloric acid/methanol solution to the reaction solution. Then, 3 mL of a tetrabutyl ammonium fluoride solution dissolved in 1.0 M in tetrahydrofuran was added to the terminated reaction solution and stirred at room temperature for 12 hours. Then, after precipitating in methanol, the precipitate was filtered and recovered. Finally, the polymer was obtained by drying in vacuum for one day. The polystyrene-b-poly(vinyl acetate) (SV(4-3)) diblock copolymer was also subjected to a deoxygenation reaction through the same method as the above.

Figure 30:
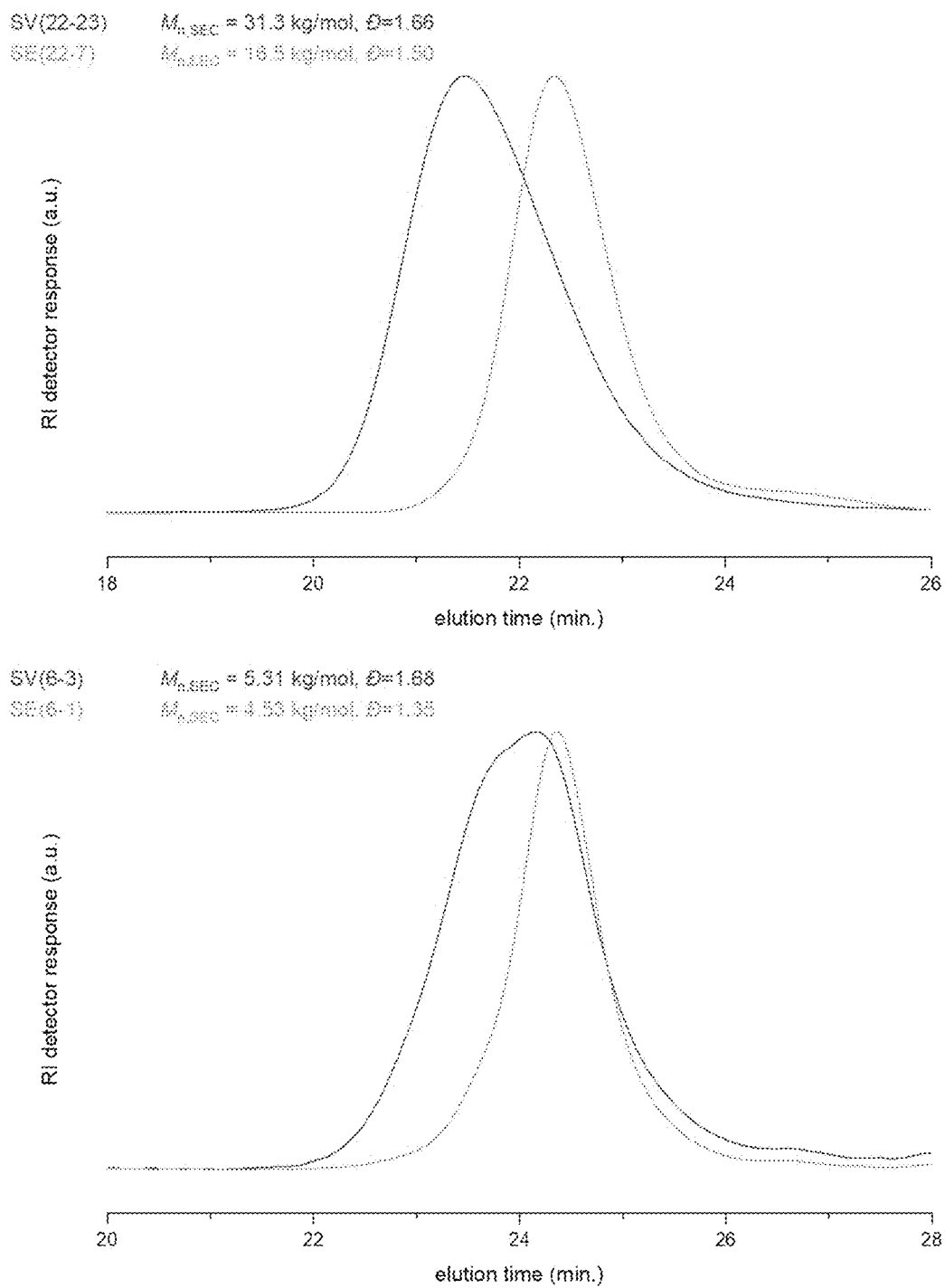
FIG. 30 is a chromatogram after deoxygenation reaction with (a) SV(22-23), (b) SV(6-3) according to an embodiment of the present invention.

The size exclusion chromatogram of the polymer analyzed after the deoxygenation reaction of the polystyrene-b-poly(vinyl acetate) diblock copolymer (SV(22-23), SV(6-3)) was shown in FIG. 30.

Figure 31:
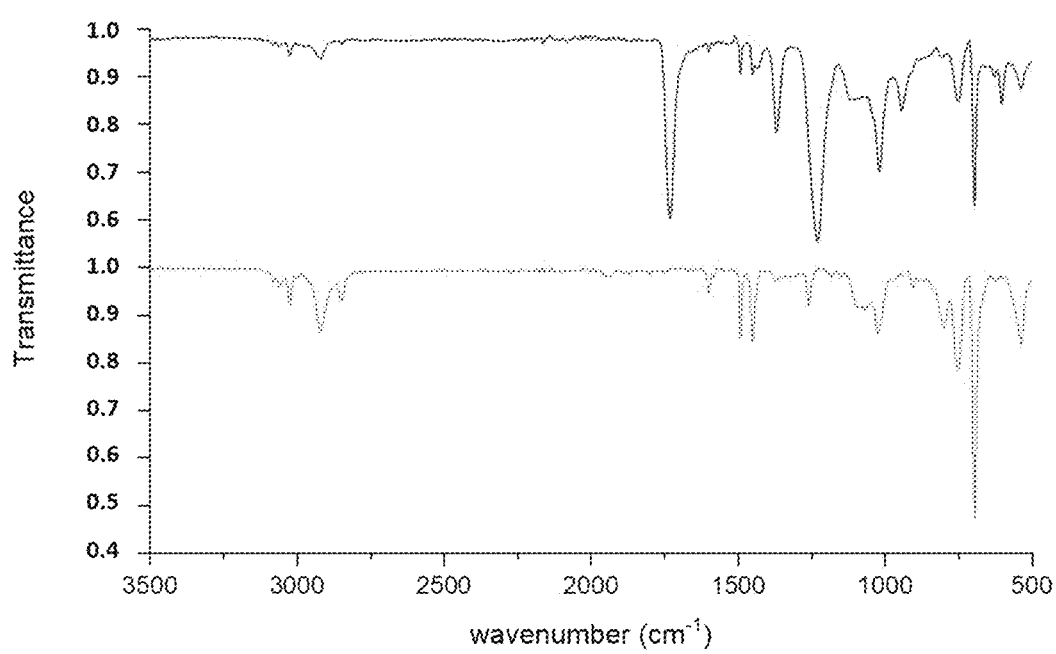
FIG. 31 is an FT-IR spectrum of SV 22-23 (blue) and SE (22-7) (orange) according to an embodiment of the present invention.
Figure 32:
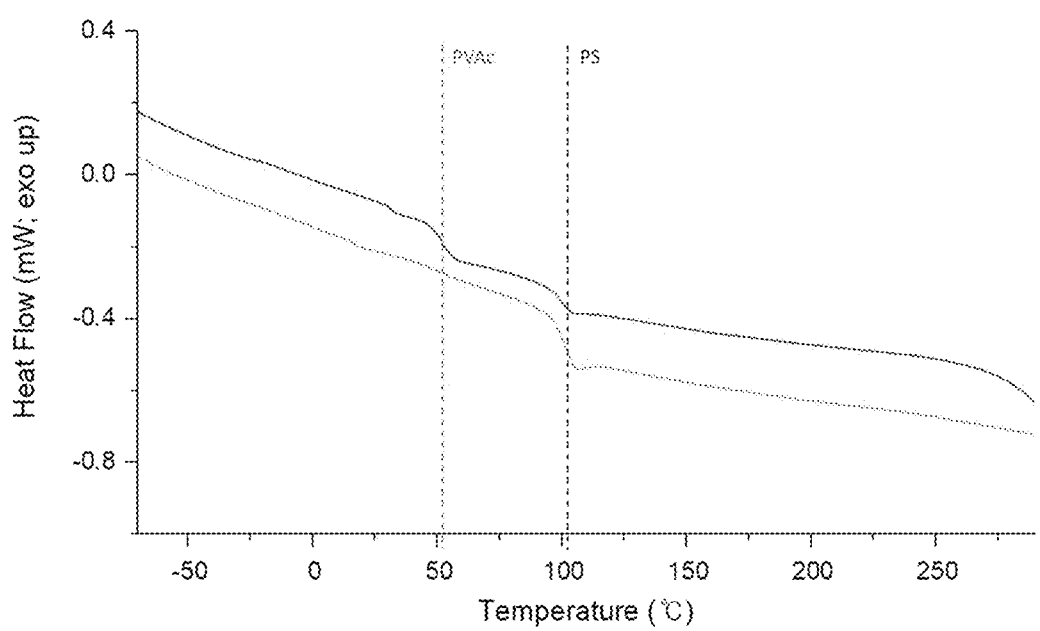
FIG. 32 is a DSC thermogram of SV (22-23) (blue) and SE (22-7) (orange) according to an embodiment of the present invention.

Based on observations from the model reaction, the properties of PE, a deoxygenation product of PVAc, were analyzed. The disappearance of the C=O vibration band at 1730 cm$^{-1}$ in the FTIR spectrum supports the progress of the deoxygenation reaction, which indicates that the vinyl acetate monomer containing carbonyl has been completely converted to ethylene (FIG. 31). In addition, the chemical modification of PVAc to PE also affects the thermal properties of the diblock copolymer. Differential Scanning calorimetry (DSC) data of SV(22-23) shows two distinct glass transitions at 100° C. and 50° C. corresponding to PS and PVAc, respectively, and SE(22-7) shows no glass transition corresponding to PVAc and thus it can be confirmed that vinyl acetate monomer was converted to ethylene by a complete deoxygenation reaction (FIG. 32).

Example 5: Synthesis of Polyisobutylene Through Deoxygenation Reaction of Poly(Methyl Methacrylate)

As in Example 4, polyisobutylene was synthesized using another monomer, methyl methacrylate.

Synthesis of Polystyrene-b-Poly(Methyl Methacrylate)-b-Polystyrene (SMmS (2-16-2))

Figure 33:
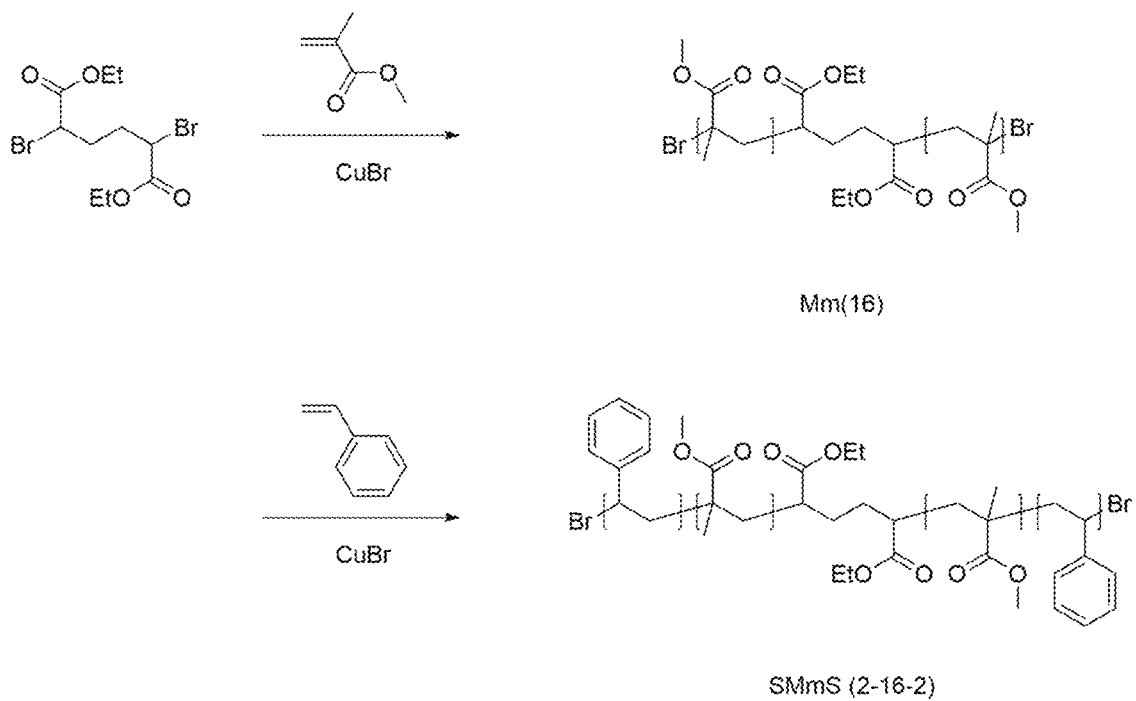
FIG. 33 is a reaction scheme showing the synthetic route of polystyrene-b-poly(methyl methacrylate)-b-polystyrene according to an embodiment of the present invention.

Polystyrene-b-poly(methyl methacrylate)-b-polystyrene was synthesized by atomic transfer radical polymerization, and in detail through the synthetic route shown in FIG. 33. First, a linear poly(methyl methacrylate) was synthesized using a bidirectional initiator and polymerized with styrene to synthesize a triblock copolymer.

First, poly(methyl methacrylate) was polymerized by the following method. 18.8 g of methyl methacrylate, 4.3 mg of copper(I) bromide, 5.2 mg of N,N,N',N'',N''-pentamethyldiethyleneamine, 0.135 g of diethyl 2,5-dibromoadipate, 10 mL of anisole was added to a 100 mL Schlenk flask to prepare a uniform polymerization solution. After three freeze-pump-thaw cycles, the mixture was placed in an oil bath at 70° C. to conduct polymer polymerization for 18 hours. Thereafter, the flask was cooled to room temperature, and then precipitated in methanol to obtain a polymer. Finally, after drying in vacuum, the polymer was recovered. It was confirmed by size exclusion chromatography that the molecular weight of the polymer was 25 kg mol$^{-1}$.

Figure 34:
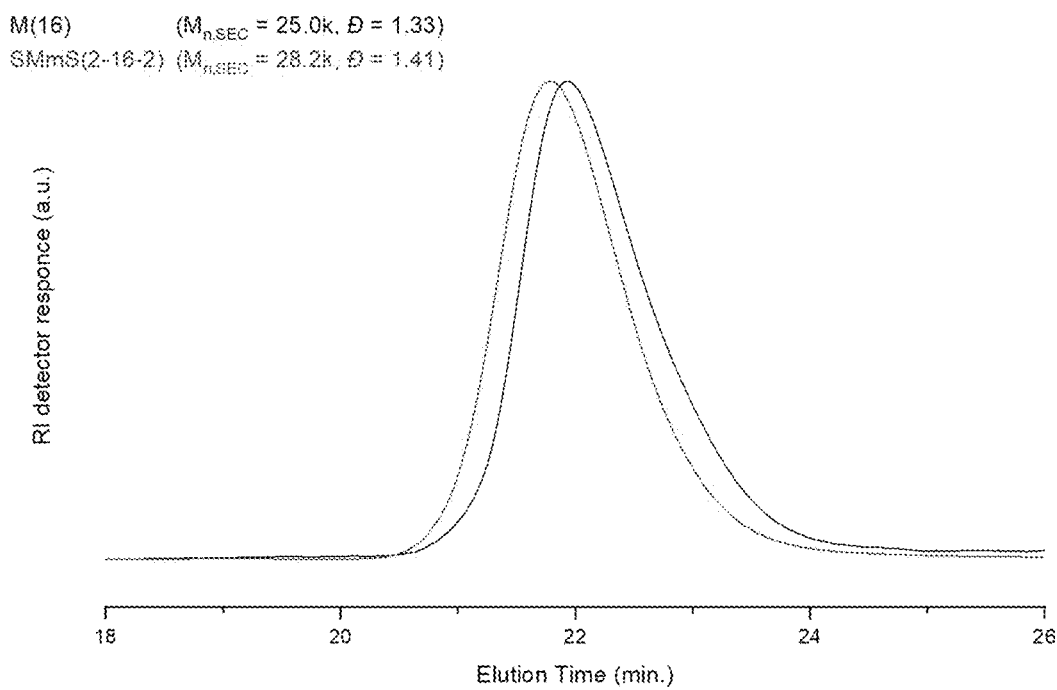
FIG. 34 is a size exclusion chromatogram of a polymer precursor containing poly(methyl methacrylate) according to an embodiment of the present invention.

Polystyrene-b-poly(methyl methacrylate)-b-poly styrene was obtained by polymerizing styrene with poly(methyl methacrylate)-macro initiator. The experiment procedure mentioned above was performed in the same manner 0.411 g of poly(methyl methacrylate)-macro initiator, 1.812 g of styrene, 0.4 mg of copper(I) bromide, 1.1 mg of 4,4'-dinonyl-2,2'-bipyridine and 1 mL of anisole was added into a 5 mL ampoule to prepare a uniform polymerization solution, and 3 freeze-pump-thaws were performed. After the polymerization reaction at 70° C. for 24 hours, a polymer was obtained through precipitation in methanol, and finally dried in a vacuum oven for 1 day to recover polystyrene-b-poly(methyl methacrylate)-b-polystyrene. It was confirmed by size exclusion chromatography that the total molecular weight of the synthesized polymer was 29 kg mol$^{-1}$. The size exclusion chromatogram of the synthesized triblock copolymer was shown in FIG. 34.

Deoxygenation Reaction of Polystyrene-b-Poly(Methyl Methacrylate)-b-Polystyrene (SMmS(2-16-2))

This example was performed in the same manner as the deoxygenation reaction of the polymer precursor containing poly(methyl acrylate). In a 20 mL vial, 0.1 g of SMmS (2-16-2) (number of units of poly(methyl methacrylate): 0.83 mmol) and 0.021 g of tris(pentafluorophenyl)borane (0.042 mmol, 5 mol % of the unit number of poly(methyl methacrylate)) were dissolved in 10 mL of dichloromethane to prepare a uniform mixture. Thereafter, 0.56 g of 1,1,3,3-tetramethyldisiloxane (4.2 mmol, 5 equivalents of the number of units of poly(methyl methacrylate)) was slowly added to the reaction solution and stirred at room temperature for one day. This polymer was analyzed by in-situ nuclear magnetic resonance experiment after removing the solvent from the reaction solution because the polystyrene repeating unit was too small to detect the precipitation in methanol. Through the analysis, it was confirmed that the methyl ester carbon of the methyl methacrylate monomer was removed by a deoxygenation reaction.

Figure 35:
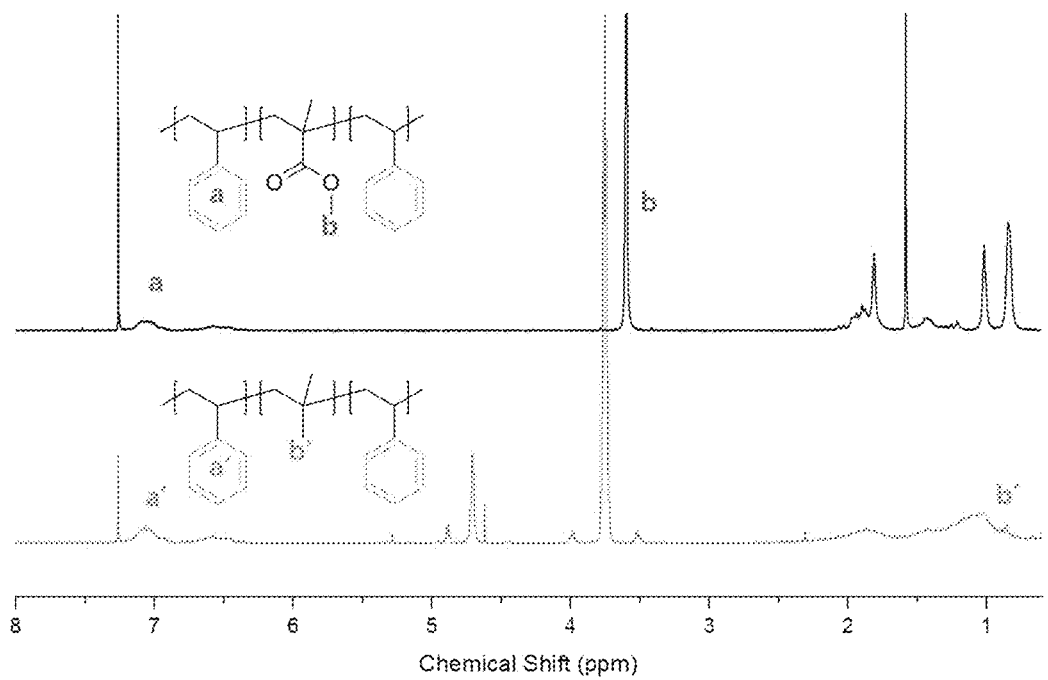
FIG. 35 is an in situ nuclear magnetic resonance spectrum after deoxygenation of SMmS (2-16-2) according to an embodiment of the present invention.

The in situ $^1$H nuclear magnetic resonance spectrum of the polystyrene-b-poly(methyl methacrylate)-b-polystyrene triblock copolymer and the polystyrene-b-polyisobutylene-b-polystyrene polymer obtained after the deoxygenation reaction was shown in FIG. 35.

In conclusion, PP, PE and PIB may be prepared from PMA, PVAc, PMMA precursors, respectively, using a post-polymerization method using B(C$_6$F$_5$)$_3$-catalyzed deoxygenation using hydrosilane. The versatility of deoxygenation was verified by the synthesis of PP, PS-b-PP, and PS-b-PP-b-PS from PMA-containing precursors, PS-b-PE from PVAc-containing precursors, PS-b-PIB-b-PS from PMMA-containing precursor which were synthesized by RAFT polymerization and ATRP with a control of the degree of deoxygenation. Since precursors consisting of a wide range of monomers having various structures can be completely prepared by RAFT polymerization and ATRP, currently developed methods enables not only a new route to polyolefin synthesis but also sufficient preparation of a pool of unprecedented polyolefin-containing functional macromolecules such as poly(methyl methylene).

INDUSTRIAL APPLICABILITY

According to the present invention, since hydrocarbon polymers are induced using, as precursors, polymers including, in side chains thereof, oxygen atom-containing functional groups such as esters and ethers, when structurally well-controlled precursors are used, well-controlled hydrocarbon polymers can be synthesized. Olefin monomers containing esters, ethers, or the like in side chains thereof stabilize anions or radicals well, and thus various block copolymers and polymers having complicated architectures can be prepared through previously established anionic polymerization and controlled radical polymerization. In particular, by copolymerizing various olefin monomers, new polyolefin polymer groups such as poly(ethylene-co-isobutylene) and poly(propylene-co-isobutylene), which were previously unimaginable, can be synthesized.

In addition, by controlling the degree of the dehydrogenation reaction, a functional hydrocarbon polymer having a controlled density of functional groups can be obtained, and when a polymer having ester groups bound to all carbon atoms of a main chain thereof, such as poly(maleic acid) or poly(dimethyl fumarate), is used as a precursor, it can also be used as a method of preparing new hydrocarbon polymers other than polyolefins.

While specific embodiments of the present invention have been described in detail, it will be obvious to those of ordinary skill in the art that these embodiments are provided for illustrative purposes only and are not intended to limit the scope of the present invention. Thus, the substantial scope of the present invention should be defined by the appended claims and equivalents thereof.

What is claimed is:

1. A method of preparing a polymer, the method comprising deoxygenating a hydrocarbon polymer precursor having side chains with oxygen atom-containing functional groups bound thereto in the presence of a catalyst and a reducing agent to remove the functional groups of the side chains.

2. The method of preparing a polymer of claim 1, wherein the oxygen atom-containing functional groups are ester, ether or hydroxyl groups.

3. The method of preparing a polymer of claim 1, wherein the polymer is a homopolymer, a block copolymer, a random copolymer, an alternating copolymer, a star copolymer, a hyperbranched polymer or a statistical copolymer.

4. The method of preparing a polymer of claim 1, wherein the hydrocarbon polymer precursor having side chains with oxygen atom-containing functional groups bound thereto is at least one selected from the group consisting of poly(vinyl acetate), poly(methyl acrylate), poly(ethyl acrylate), poly (isopropyl acrylate), poly(n-butyl acrylate), poly(methyl methacrylate), poly(dimethyl fumarate), poly(isopropyl fumarate), poly(maleic acid), poly(ethoxy carbonyl methylene), poly(dimethylacrylamide), poly(diethylacrylamide), poly(N-isopropylacrylamide), poly(dimethylmethacrylamide) and poly(N-vinylpyrrolidone).

5. The method of preparing a polymer of claim 1, wherein the hydrocarbon polymer precursor having side chains with oxygen atom-containing functional groups bound thereto further comprises a polymer precursor not capable of being deoxygenated.

6. The method of preparing a polymer of claim 5, wherein the polymer precursor not capable of being deoxygenated is at least one selected from the group consisting of polystyrene, poly(t-butylstyrene), poly(a-methylstyrene) and poly (vinyl pyridine).

7. The method of preparing a polymer of claim 1, wherein the polymer is polyethylene, polypropylene, polyisobutylene, poly(methyl methylene), poly(ethylene-co-propylene), poly(ethylene-co-isobutylene), poly(propylene-co-isobutylene), polystyrene-b-polypropylene-b-polystyrene, poly(methyl methylene)-b-polystyrene), polystyrene-b-poly(propylene-co-allyl alcohol-co-allyl methyl ether-co-methyl acrylate), poly(allylamine), poly(2-methylprop-2-en-1-amine) or poly(ethyleneamine).

8. The method of preparing a polymer of claim 5, wherein the polymer is polyethylene, polypropylene, polyisobutylene, poly(methyl methylene), poly(ethylene-co-propylene), poly(ethylene-co-isobutylene), poly(propylene-co-isobutylene), polystyrene-b-polypropylene-b-polystyrene, poly(methyl methylene)-b-polystyrene), polystyrene-b-poly(propylene-co-allyl alcohol-co-allyl methyl ether-co-methyl acrylate), poly(allylamine), poly(2-methylprop-2-en-1-amine) or poly(ethyleneamine).

9. The method of preparing a polymer of claim 1, wherein the catalyst is a Lewis acid catalyst.

10. The method of preparing a polymer of claim 1, wherein the reducing agent is at least one selected from the group consisting of 1,1,3,3-tetramethyldisiloxane, diethylsilane, dimethylethylsilane, diphenylsilane, n-butylsilane, triethylsilane, pentamethyldisiloxane, dimethylsilane, benzyldimethylsilane, dimethylethylsilane, 1,1,3,3,5,5-hexamethyltrisiloxane, 1,1,3,3,3-pentamethyldisiloxane, and 1,1,1,3,5,5,5-heptamethyltrisiloxane.

11. The method of preparing a polymer of claim 1, wherein a functional hydrocarbon polymer with controlled functional group density is synthesized by adjusting a degree of the deoxygenation.

12. A polymer comprising poly(methyl methylene) or polystyrene-b-poly(propylene-co-allyl alcohol-co-allyl methyl ether-co-methyl acrylate).

* * * * *

UNITED STATES PATENT AND TRADEMARK OFFICE
CERTIFICATE OF CORRECTION

PATENT NO.      : 11,555,086 B2
APPLICATION NO. : 16/940502
DATED           : January 17, 2023
INVENTOR(S)     : Myungeun Seo et al.

It is certified that error appears in the above-identified patent and that said Letters Patent is hereby corrected as shown below:

In the Specification

Column 7, Line 55, "2202-2220)" should be -- 2202-2220). --.

Column 9, Line 6, "S183,000,000,000" should be -- $183,000,000,000 --.

Column 9, Line 7, "135,000,000,000" should be -- $135,000,000,000 --.

In the Claims

Column 26, Line 62, "poly(a-methylstyrene)" should be -- poly(α-methylstyrene) --.

Signed and Sealed this
Twenty-first Day of February, 2023

*Katherine Kelly Vidal*
Katherine Kelly Vidal
*Director of the United States Patent and Trademark Office*